US012634353B2

(12) United States Patent
Wang

(10) Patent No.: US 12,634,353 B2
(45) Date of Patent: *May 19, 2026

(54) ENHANCED LEARNING AND DETERMINATION OF SECURITY RULES FOR DATA TRAFFIC

(71) Applicant: AT&T Intellectual Property I, L.P., Atlanta, GA (US)

(72) Inventor: Wei Wang, Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/890,235

(22) Filed: Sep. 19, 2024

(65) Prior Publication Data

US 2025/0016203 A1    Jan. 9, 2025

Related U.S. Application Data

(63) Continuation of application No. 17/507,526, filed on Oct. 21, 2021, now Pat. No. 12,126,656.

(51) Int. Cl.
*H04L 9/40*        (2022.01)
*G06N 20/00*       (2019.01)
(Continued)

(52) U.S. Cl.
CPC ........... *H04L 63/205* (2013.01); *G06N 20/00* (2019.01); *H04L 41/14* (2013.01); *H04L 41/16* (2013.01); *H04L 67/10* (2013.01)

(58) Field of Classification Search
CPC ......... G06N 20/00; H04L 41/14; H04L 41/16; H04L 41/40; H04L 63/205; H04L 67/10
See application file for complete search history.

(56) References Cited

U.S. PATENT DOCUMENTS 9,438,435 B2 *   9/2016   Iyer ...................... H04L 12/185
10,007,721 B1 *   6/2018   Klein ..................... G06F 16/358
(Continued)

OTHER PUBLICATIONS

Jin, Cheng , et al., "Concise Paper: Secgras: Security Group Analysis As a Cloud Service", 2014 IEEE 22nd International Conference on Network Protocols, Oct. 21-24, 2014, 6 pages.

*Primary Examiner* — Gary S Gracia
(74) *Attorney, Agent, or Firm* — Guntin & Gust, PLC; Erik Boyd

(57)            ABSTRACT
Security rules to apply to resources, including virtual machines (VMs), in the cloud and on network edges can be learned, determined, and tested. A security management component (SMC) can analyze information relating to data traffic associated with a group of resources associated with a tenant. The analysis can comprise an artificial intelligence analysis. Ingress/egress of the data traffic to/from resources of the group of resources initially can be controlled based on a group of security rules selected by the tenant. Based on a result of the analyzing, SMC can determine a modified group of security rules to apply to the group of resources to control ingress/egress of subsequent data traffic to/from the resources, wherein the result of the analyzing can indicate respective first relationships determined between respective resources and respective second relationships determined between the respective resources and respective network addresses associated with the cloud network.

20 Claims, 12 Drawing Sheets

(51) Int. Cl.

| | |
|---|---|
| *H04L 41/14* | (2022.01) |
| *H04L 41/16* | (2022.01) |
| *H04L 67/10* | (2022.01) |

(56) References Cited

U.S. PATENT DOCUMENTS

| | | | | |
|---|---|---|---|---|
| 10,298,720 | B1 * | 5/2019 | Miller | H04L 41/40 |
| 10,341,188 | B2 * | 7/2019 | Chu | H04L 41/12 |
| 10,481,939 | B2 * | 11/2019 | Barabash | H04L 47/24 |
| 10,645,121 | B1 * | 5/2020 | Nimmagadda | H04L 63/0263 |
| 10,972,508 | B1 * | 4/2021 | Dods | H04L 63/1433 |
| 11,281,846 | B2 * | 3/2022 | DeRose | G06F 40/137 |
| 11,290,478 | B2 * | 3/2022 | Weingarten | H04L 63/1425 |
| 11,652,848 | B1 * | 5/2023 | Talur | H04L 63/20 |
| | | | | 726/1 |
| 2015/0082432 | A1 * | 3/2015 | Eaton | H04L 43/16 |
| | | | | 726/23 |
| 2016/0094413 | A1 * | 3/2016 | Jain | H04L 47/52 |
| | | | | 709/226 |
| 2016/0173535 | A1 * | 6/2016 | Barabash | H04L 63/20 |
| | | | | 726/1 |
| 2016/0359697 | A1 * | 12/2016 | Scheib | H04L 41/0893 |
| 2018/0375831 | A1 * | 12/2018 | Kliger | H04L 63/0263 |
| 2019/0230032 | A1 * | 7/2019 | Landau | H04L 45/56 |
| 2020/0259789 | A1 * | 8/2020 | Yang | G06F 9/45558 |
| 2020/0336513 | A1 * | 10/2020 | Martin | H04L 63/205 |
| 2021/0014274 | A1 * | 1/2021 | Monni | H04L 41/0894 |
| 2021/0037061 | A1 * | 2/2021 | Trost | H04L 63/1425 |
| 2021/0152607 | A1 * | 5/2021 | Dixit | H04L 41/0894 |
| 2021/0218661 | A1 * | 7/2021 | Wang | H04L 45/04 |
| 2021/0234898 | A1 * | 7/2021 | Desai | H04L 63/104 |
| 2021/0400084 | A1 * | 12/2021 | Ali | G06F 21/56 |
| 2022/0006751 | A1 * | 1/2022 | Ramaswamy | H04L 45/38 |
| 2022/0038311 | A1 * | 2/2022 | Shen | H04L 63/0263 |
| 2022/0247666 | A1 * | 8/2022 | Roersma | H04L 41/0803 |
| 2022/0321534 | A1 * | 10/2022 | Jeuk | H04L 63/0876 |
| 2022/0377021 | A1 * | 11/2022 | Sadasivan | H04L 45/42 |
| 2023/0128064 | A1 * | 4/2023 | Wang | H04L 63/0236 |
| | | | | 726/1 |
| 2025/0141931 | A1 * | 5/2025 | Sanghvi | H04L 63/0227 |

* cited by examiner

124

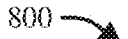

800

ANALYZING INFORMATION RELATING TO RESPECTIVE ITEMS OF DATA TRAFFIC ASSOCIATED WITH A GROUP OF RESOURCES ASSOCIATED WITH A TENANT IDENTITY, WHEREIN THE GROUP OF RESOURCES CAN BE ASSOCIATED WITH CLOUD NETWORK EQUIPMENT OF A CLOUD NETWORK, AND WHEREIN INGRESS AND EGRESS OF THE RESPECTIVE ITEMS OF DATA TRAFFIC TO AND FROM RESPECTIVE RESOURCES OF THE GROUP OF RESOURCES CAN BE CONTROLLED BASED AT LEAST IN PART ON A GROUP OF SECURITY RULES ASSOCIATED WITH THE TENANT IDENTITY

802

BASED ON A RESULT OF THE ANALYZING, DETERMINING A MODIFIED GROUP OF SECURITY RULES, WHICH CAN BE APPLIED TO THE GROUP OF RESOURCES ASSOCIATED WITH THE TENANT IDENTITY, TO FACILITATE CONTROLLING INGRESS AND EGRESS OF SUBSEQUENT ITEMS OF DATA TRAFFIC TO AND FROM THE RESPECTIVE RESOURCES BASED ON THE MODIFIED GROUP OF SECURITY RULES, WHEREIN THE RESULT OF THE ANALYZING CAN INDICATE RESPECTIVE FIRST RELATIONSHIPS DETERMINED BETWEEN THE RESPECTIVE RESOURCES AND RESPECTIVE SECOND RELATIONSHIPS DETERMINED BETWEEN THE RESPECTIVE RESOURCES AND RESPECTIVE NETWORK ADDRESSES ASSOCIATED WITH THE CLOUD NETWORK AND COMMUNICATION NETWORK

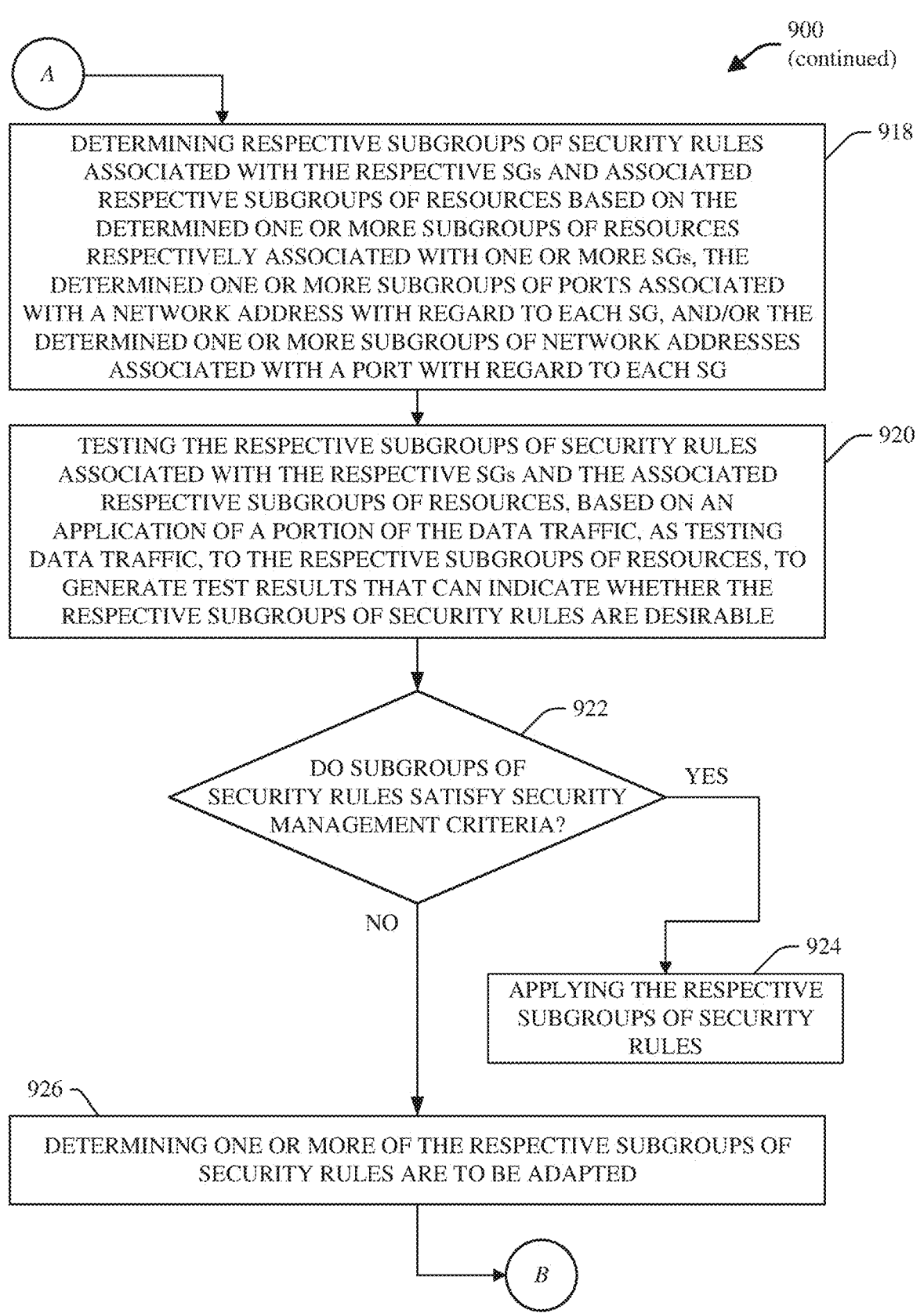

900
(continued)

A

DETERMINING RESPECTIVE SUBGROUPS OF SECURITY RULES ASSOCIATED WITH THE RESPECTIVE SGs AND ASSOCIATED RESPECTIVE SUBGROUPS OF RESOURCES BASED ON THE DETERMINED ONE OR MORE SUBGROUPS OF RESOURCES RESPECTIVELY ASSOCIATED WITH ONE OR MORE SGs, THE DETERMINED ONE OR MORE SUBGROUPS OF PORTS ASSOCIATED WITH A NETWORK ADDRESS WITH REGARD TO EACH SG, AND/OR THE DETERMINED ONE OR MORE SUBGROUPS OF NETWORK ADDRESSES ASSOCIATED WITH A PORT WITH REGARD TO EACH SG — 918

TESTING THE RESPECTIVE SUBGROUPS OF SECURITY RULES ASSOCIATED WITH THE RESPECTIVE SGs AND THE ASSOCIATED RESPECTIVE SUBGROUPS OF RESOURCES, BASED ON AN APPLICATION OF A PORTION OF THE DATA TRAFFIC, AS TESTING DATA TRAFFIC, TO THE RESPECTIVE SUBGROUPS OF RESOURCES, TO GENERATE TEST RESULTS THAT CAN INDICATE WHETHER THE RESPECTIVE SUBGROUPS OF SECURITY RULES ARE DESIRABLE — 920

922
DO SUBGROUPS OF SECURITY RULES SATISFY SECURITY MANAGEMENT CRITERIA?

YES

NO

APPLYING THE RESPECTIVE SUBGROUPS OF SECURITY RULES — 924

926 — DETERMINING ONE OR MORE OF THE RESPECTIVE SUBGROUPS OF SECURITY RULES ARE TO BE ADAPTED

ENHANCED LEARNING AND DETERMINATION OF SECURITY RULES FOR DATA TRAFFIC

CROSS-REFERENCE TO RELATED APPLICATION(S)

This application is a continuation of U.S. patent application Ser. No. 17/507,526, filed on Oct. 21, 2021. All sections of the aforementioned application(s) and/or patent(s) are incorporated herein by reference in their entirety.

TECHNICAL FIELD

This disclosure relates generally to electronic communications, e.g., to enhanced learning and determination of security rules for data traffic.

BACKGROUND

With many applications moving into the cloud, a mode of operating a business can be running all or some aspects of the business in the cloud where applications can sit on the same hardware and share resources with other tenants in the cloud. This multi-tenant system in the cloud can potentially bring security concerns not only from the Internet but also from other tenants residing in the same cloud system.

The above-described description is merely intended to provide a contextual overview regarding electronic communications, and is not intended to be exhaustive.

BRIEF DESCRIPTION OF THE DRAWINGS

FIG. 8 illustrates a flow chart of an example method that can desirably learn and/or determine security rules to apply to resources, including VMs, in a cloud network and on network edges, in accordance with various aspects and embodiments of the disclosed subject matter.

FIGS. 9 and 10 depict a flow chart of an example method that can desirably learn, determine, and test security rules to apply to resources, including VMs, in a cloud network and on network edges, in accordance with various aspects and embodiments of the disclosed subject matter.

DETAILED DESCRIPTION

Figure 1:
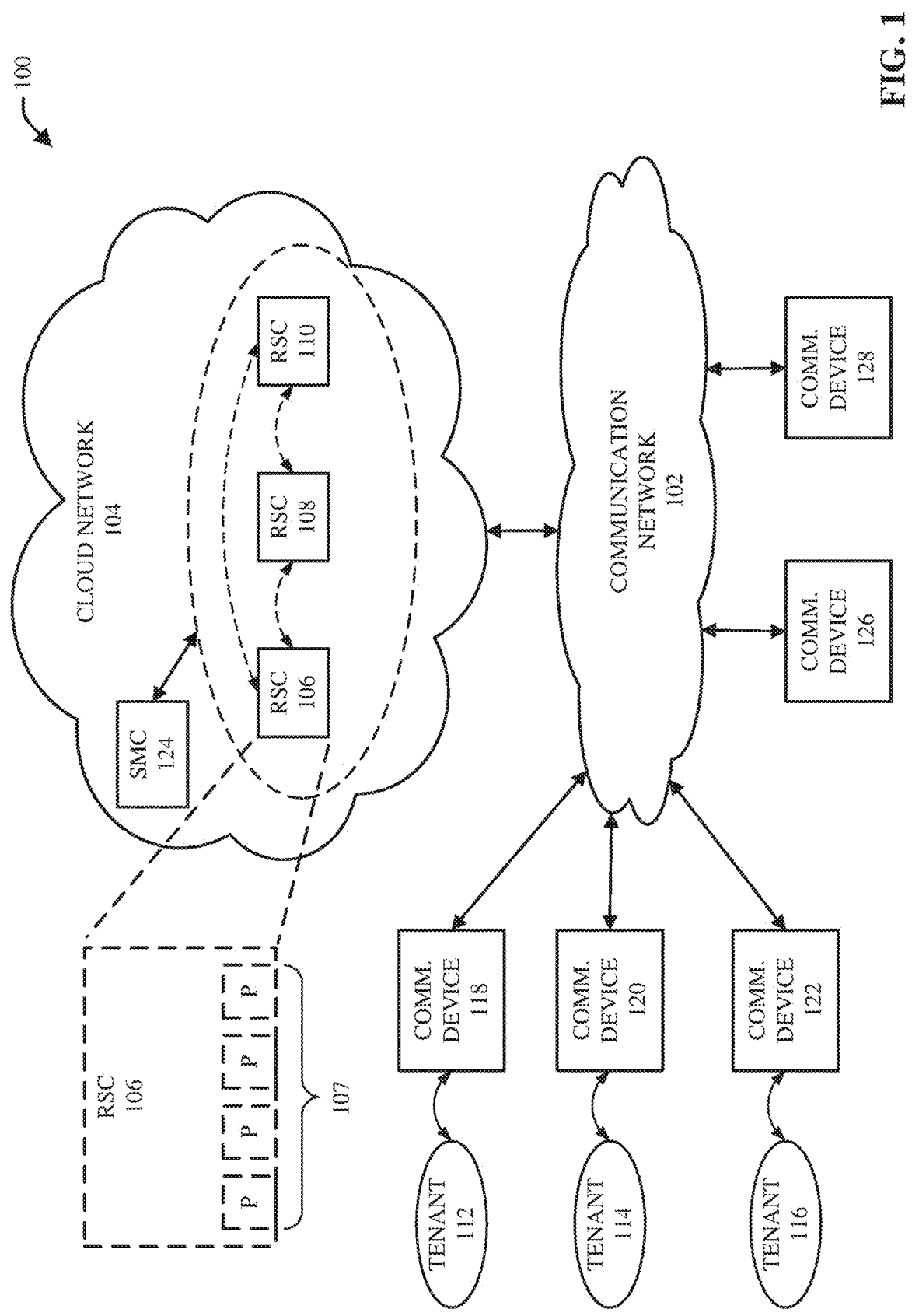
FIG. 1 illustrates a block diagram of an example system that can desirably learn, determine, and test security rules to apply to resources, including virtual machines (VMs), in a cloud network and on network edges, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

With many applications moving into the cloud, a mode of operating a business can be running all or some aspects of the business in the cloud where applications can sit on the same hardware and share resources with other tenants in the cloud. This multi-tenant system in the cloud can potentially bring security concerns not only from the Internet but also from other tenants residing in the same cloud system. It can be desirable to have security rules or policies in place to filter network traffic to and from cloud resources in a cloud virtual network. Security rules can allow or deny inbound network traffic to, or outbound network traffic from, the Internet or the same virtual networks from the same cloud provider. Therefore, it can be desirable to configure appropriate (e.g., suitable, correct, and/or optimal) security rules to protect the assets in the cloud.

The reality, however, is that it turns out that it can be a difficult task to set up appropriate security rules due to the complexity of the problem. To start with, the security rules can be nested and hierarchical, and it can be more difficult to set up than conventional firewall rules. Also, due to the lack of the overall view of the network architecture or the lack of experience, a cloud tenant can make mistakes in configuration of security rules. Existing techniques can rely solely, or at least primarily, on the cloud tenant, where the cloud tenant has to use his/her experience to manually configure all security rules to all application instances. In practice, when manually setting up these nested rules, rules often can undesirably (e.g., unsuitably, unacceptably, and/or incorrectly) be too open, as will be described herein; and sometimes the security rules can be undesirably redundant, overlapping each other, and thus, can be less efficient when applying them over network traffic, or even can be conflicting each other.

A typical set up can be that an application can reside in a Virtual Machine (VM) or more than one VM. A security group (SG) can be a set of security rules evaluated using information such as the network tuple (e.g., ipv4/ipv6, source, source port, destination, destination port, and/or protocol) associated with data traffic to allow or deny the data traffic. An SG, typically, by default, can deny all ingress traffic and allow all egress data traffic.

A VM can be governed by one or more SGs, and an SG can be applied on one or more VMs, so, as a result, there can be a multi-multi relationship between VMs and SGs. There typically can be a hierarchy in the network set up. Based on functionality, some VMs can have direct connection from the Internet; some VMs just have to connect to other VMs governed by the same SG; and/or some VMs have to connect to VMs under a different SG but within the cloud environment. Therefore, it can be desirable for the security rules being configured to reflect precisely such connection relationships, e.g., meaning that VMs should not be open to the whole Internet or even other SGs if such VMs do not have to be open to the whole Internet and/or other SGs; meanwhile, no dropping of legitimate traffic to perform VM functionalities.

To that end, techniques for desirably learning, determining, and testing security rules to apply to resources, including VMs, in a cloud network and on network edges are presented. The cloud network can support multiple tenants and support or provide multiple applications or services. The cloud network can be associated with (e.g., communicatively connected to) a communication network and/or all or a portion of the cloud network can be part of a communication network. The cloud network can comprise resources, including VMs, that can be utilized by applications that can be utilized by the tenants. The resources can be shared among multiple tenants of the cloud network, which can comprise a multi-tenant cloud network services system.

The disclosed subject matter can comprise a security management component (SMC) that can analyze information relating to respective items of data traffic associated with respective resources of a group of resources associated with a tenant. In some embodiments, the analysis can comprise an artificial intelligence (AI) and/or machine learning (ML) analysis of the information relating to the respective items of data traffic. Initially (or at another desired point where the analysis is to be performed), ingress and egress of the respective items of data traffic to and from resources of the group of resources initially can be controlled based at least in part on a group of security rules selected by the tenant (or someone associated with the tenant), and the information relating to the respective items of data traffic can be collected for a desired period of time while the group of security rules is being applied to the group of resources.

Based at least in part on a result of the analysis (e.g., non-AI analysis and/or AI/ML analysis) of the information relating to the respective items of data traffic, the SMC can determine a modified group of security rules that can be applied to the group of resources to control ingress and egress of subsequent items of data traffic to and from the resources of the group of resources, wherein the result of the analyzing can indicate respective first relationships determined between respective resources and respective second relationships determined between the respective resources and respective network addresses associated with the cloud network, as more fully described herein. For instance, from the analysis, the SMC can identify respective resources (e.g., VMs) that have communicated (e.g., frequently communicated) with each other and/or share other characteristics (e.g. the type of traffic-streaming or web traffic, session duration, packet size, or other type of characteristic) such that it can be desirable for those resources to be grouped (e.g., clustered) together in a same subgroup of resources that can be associated with a same SG that can be associated with a subgroup of security rules. In some embodiments, the SMC also can consider other additional metadata when making determinations regarding the grouping of resources, wherein such metadata can comprise, for example, application descriptions running on resources (e.g., VMs) and the overall application setup architecture for the application associated with the tenant, such as described herein. From the analysis, the SMC can determine a desired number of respective subgroups of resources associated with respective SGs associated with respective subgroups of security rules, in accordance with defined security management criteria. Also, from the analysis, with regard to each subgroup of resources, the SMC can determine relationships (e.g., second relationships, such as communications, interactions, and/or shared, common, or similar characteristics) between respective ports (e.g., ports with respectively associated port numbers) associated with the subgroup of resources and a network address and/or relationships between respective network addresses and a port associated with the subgroup of resources. Based at least in part on such second relationships, for each of desired network addresses, the SMC can group (e.g., cluster) respective ports to a network address with which there is such relationship, and/or, for each of desired ports, the SMC can group respective network addresses to a port with which there is such relationship.

In some embodiments, the SMC can present grouping-related information (e.g., clustering-related information) to the tenant (e.g., via an interface and/or communication device associated with the tenant) for evaluation by the tenant, wherein the grouping-related information can indicate or specify the respective subgroups of resources, and/or, for each SG, the respective subgroups of ports associated with an SG associated with a subgroup of resources to a network address and/or the respective subgroups of network addresses to a port associated with an SG associated with a subgroup of resources. The tenant can evaluate the grouping-related information. Based on the experiences of the tenant and/or the tenant manipulating the clusters to change cluster sizes or move elements (e.g., resources, ports, or network addresses) between clusters (e.g., from one cluster to another cluster) or out of clusters to determine whether the tenant desires different subgroupings to fit the tenant's desired usage of resources and/or desired security of data, the tenant can decide to either keep the subgroupings determined by the SMC or can change the subgroupings, as desired by the tenant.

Based at least in part on the grouping-related information and/or changes made to the subgroupings by the tenant, the SMC can summarize, synthesize, or characterize the subgroups of resources, subgroups of ports to a network address, and/or subgroups of network addresses to a port (e.g., patterns, such as graphical patterns, relating to the subgroupings), and, based at least in part on such summarizing, synthesizing, or characterizing of the subgroupings, the SMC can determine respective subgroups of security rules that can be associated with respective SGs that can be associated with respective subgroups of resources, in accordance with the defined security management criteria. For instance, the SMC can translate the summarizing, synthesizing, or characterizing of the subgroupings into the respective subgroups of security rules associated with respective SGs. The respective subgroups of security rules can be modified or different relative to the initial group of rules applied to the items of data traffic (unless the initial group of security rules happened to be desirable already).

In certain embodiments, the SMC can test the respective subgroups of security rules associated with the respective SGs to facilitate determining whether the respective subgroups of security rules are desirable (e.g., suitable, acceptable, and/or optimal) to the tenant. For instance, the SMC can utilize a portion of the items of data traffic as testing data traffic, and can apply the testing data traffic to the respective subgroups of resources (e.g., VMs) associated with the respective SGs while applying the respective subgroups of security rules to the respective subgroups of resources associated with the respective SGs. The SMC can obtain (e.g., receive or collect) testing information relating to the results of applying the testing data traffic to the respective subgroups of resources while applying the respective subgroups of security rules to the respective subgroups of resources. The SMC and/or the tenant can analyze the testing information, and, based at least in part on the results of such analysis, the SMC and/or the tenant can determine whether the respective subgroups of security rules are performing in a desirable manner to control the ingress and egress of items of testing data traffic to and from respective resources of the respective subgroups of resources such that the respective resources are not open to ingress or egress of data traffic beyond what is desired by the tenant and items of testing data traffic are not being undesirably (e.g., incorrectly or inappropriately) dropped or blocked from ingress or egress to or from respective resources.

If, based on the analysis of the testing information, the SMC and/or the tenant determines that the respective subgroups of security rules associated with the respective SGs are performing as desired to control ingress and egress of data traffic to and from respective resources of the respective subgroups of resources, the SMC can apply the respective subgroups of security rules associated with the respective SGs to subsequent items of data traffic associated with respective resources of the respective subgroups of resources associated with the respective SGs for a desired amount of time. If, instead, based on the analysis of the testing information, the SMC and/or the tenant determines that the respective subgroups of security rules associated with the respective SGs are not performing as desired to control ingress and egress of data traffic to and from respective resources of the respective subgroups of resources, the tenant and/or the SMC can adapt the subgroups of resources, subgroups of ports to a network address, and/or subgroups of network addresses to a port, with regard to the SGs to facilitate changing the respective subgroups of security rules to change how data traffic is managed with regard to the respective resources. Based at least in part on the adaptations by the tenant and/or SMC, the SMC can summarize, synthesize, or characterize the subgroups of resources, subgroups of ports to a network address, and/or subgroups of network addresses to a port (e.g., patterns, such as graphical patterns, relating to the subgroupings), as adapted by the tenant and/or SMC. Based at least in part on such summarizing, synthesizing, or characterizing of the adapted subgroupings, the SMC can determine respective subgroups (e.g., respective adapted subgroups) of security rules that can be associated with respective SGs that can be associated with respective subgroups of resources, in accordance with the defined security management criteria. If and as desired, the testing and/or adapting of the respective subgroups of security rules can continue through one or more iterations until the tenant is satisfied that the respective subgroups of security rules associated with the respective SGs are desirable to the tenant.

The disclosed subject matter, by employing the SMC and the techniques described herein, can enhance (e.g., improve or optimize) the learning (e.g., automatic learning, determination (e.g., automatic determination), recommendation (e.g., automatic recommendation), and implementation of security rules associated with applications associated with (e.g., utilized by) tenants in a cloud environment, and, accordingly, can provide benefits to tenants and cloud service providers, as compared to existing techniques for determining security rules for applications in a cloud environment. The disclosed subject matter also can be applied to and utilized for edge computing environments. The disclosed subject matter, by employing the SMC and the techniques described herein, can determine or facilitate determining security rules that, by design, can desirably not have conflicted security rules (e.g., rules that conflict with each other with regard to allowance or denial of data traffic) or at least can desirably minimize or substantially eliminate conflicted security rules, in contrast to existing techniques, including manual rule selection techniques, where conflicted security rules can be common and undesirable. Also, the security rules determined using the techniques of the disclosed subject matter can be more accurate than other security rules determined using existing techniques, as the security rules determined using the techniques of the disclosed subject matter can desirably be both open enough to allow certain resources (e.g., VMs) to be open to the Internet or other SGs (e.g., resources of other SGs) when it can be desirable (e.g., appropriate or wanted) for such certain resources to be able receive data traffic from or communicate data traffic to the Internet or the other SGs such that desirable (e.g., legitimate or wanted) data traffic desirably is not denied or dropped, and restrictive enough to restrict or prevent certain resources from being open to certain parts of or associated with the Internet (e.g., certain network addresses associated with the Internet) or other SGs (e.g., some of the other SGs) when it can be desirable for such certain resources to not receive data traffic from or communicate data traffic to the Internet or the other SGs such that undesirable (e.g., illegitimate, malicious, or unwanted) data traffic desirably can be denied or dropped.

These and other aspects and embodiments of the disclosed subject matter will now be described with respect to the drawings.

Referring now to the drawings, FIG. 1 illustrates a block diagram of an example system 100 that can desirably learn, determine, and test security rules to apply to resources, including VMs, in a cloud network and on network edges, in accordance with various aspects and embodiments of the disclosed subject matter. The system 100 can comprise a communication network 102 can comprise a packet data network (e.g., an Internet Protocol (IP)-based network, such as the Internet and/or intranet) and/or a mobility core network (e.g., a wireless communication network), wherein the packet data network can be associated with (e.g., communicatively connected to) the mobility core network. The communication network 102 can comprise various network equipment, devices, components, and/or nodes (e.g., data processing equipment, transceivers, base stations, antennas, or other network equipment) that can be used to facilitate wireline or wireless communication of data between communication devices and the communication network 102, and/or between communication devices and a cloud network 104 and/or other communication devices associated with the communication network 102.

The system 100 also can comprise the cloud network 104 that can be associated with (e.g., communicatively connected to) the communication network 102 and/or all or a portion of the cloud network 104 can be part of a communication network 102. The cloud network 104 can support multiple tenants and support or provide multiple applications or services (e.g., applications or services relating to business, finance, entertainment, recreation, productivity, personal matters, and/or other matters). The cloud network 104 can comprise various resources, including VMs, that can be utilized by applications associated with or utilized by the tenants. The cloud network 104 can comprise a desired number of resources, comprising, resource (RSC) 106, resource 108, and resource 110, wherein the number of resources can be virtually any desired number. Some resources (e.g., 106, 108, and/or 110), such as a VM, can comprise a group of ports (e.g., ports (P) 107), which can comprise a desired number of ports, wherein respective ports can be associated with respective port addresses, and wherein a port can be utilized to communicate data or signals from the resource to a desired destination (e.g., another resource, a communication device, or another device or component) and/or receive data or signals from another resource, device, or component. In some embodiments, in addition to or as an alternative to implementing the aspects, embodiments, and techniques of the disclosed subject matter with regard to the cloud network 104 and resources of or associated with the cloud network 104, the aspects, embodiments, and techniques of the disclosed subject matter described herein also can be implemented at network edges of the communication network 102 and with regard to resources of or associated with the communication network 102.

Tenants, such as tenants 112, 114, and/or 116, can utilize communication devices, such as communication devices (COMM. DEVICE) 118, 120, and/or 122, to connect to the communication network 102 to access, utilize, and/or communicate with their respective applications or services, and/or the respective resources (e.g., 106, 108, and/or 110), in, and as provided or facilitated by, the cloud network 104. The resources (e.g., 106, 108, and/or 110) can be shared among multiple tenants of the cloud network 104, which can be or can comprise a multi-tenant cloud network services system.

A communication device (e.g., 118, 120, or 122) also can be referred to as, for example, a device, a mobile device, a mobile communication device, user equipment (UE), a terminal, or a mobile terminal, or by other similar terminology. A communication device can refer to any type of wireline device or wireless device that can communicate with the communication network 102, wherein a wireless device can communicate with a radio network node in a core network (e.g., a cellular or mobile communication system) of the communication network 102. Examples of communication devices can include, but are not limited to, a computer (e.g., a desktop computer, a laptop embedded equipment (LEE), a laptop mounted equipment (LME), or other type of computer), a phone (e.g., a smart phone, cellular phone, or other type of phone that can utilize applications), a tablet or pad (e.g., an electronic tablet or pad), an electronic notebook, a Personal Digital Assistant (PDA), a device to device (D2D) UE, a machine type UE or a UE capable of machine to machine (M2M) communication, a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, or other type of appliance having wireless communication functionality), a set-top box, an IP television (IPTV), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

Figure 2:
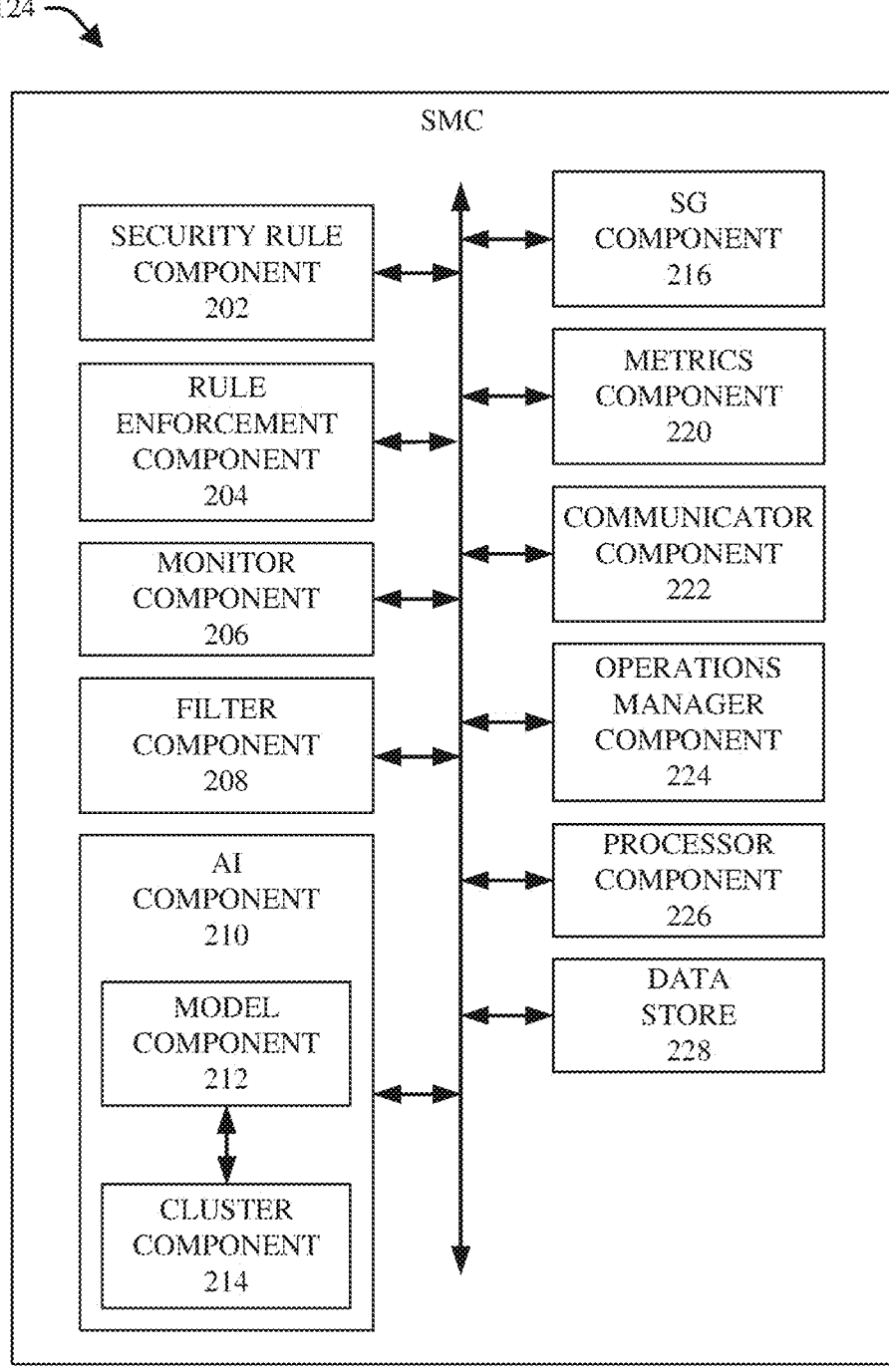
FIG. 2 depicts a block diagram of an example security management component (SMC), in accordance with various aspects and embodiments of the disclosed subject matter.
Figure 3:
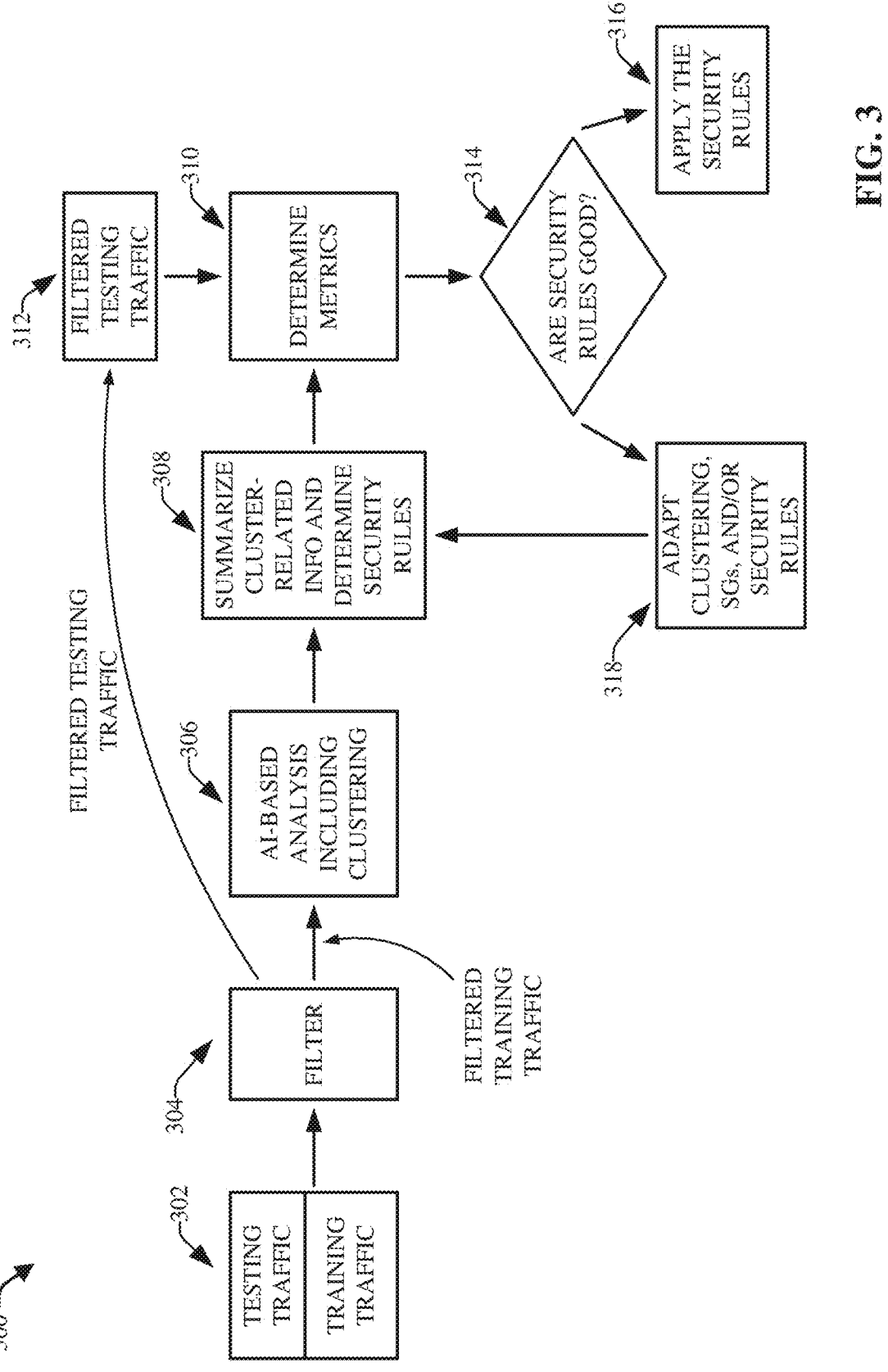
FIG. 3 illustrates a block diagram of an example security rules determination flow that can be utilized to facilitate determining desirable security rules that can be used with regard to applications associated with tenant, in accordance with various aspects and embodiments of the disclosed subject matter.

In accordance with various embodiments, the system 100 can comprise a security management component (SMC) 124 that can desirably (e.g., suitably, acceptably, and/or optimally) learn, determine, and test security rules to apply to resources, including VMs, in the cloud network 104, and on network edges associated therewith, with respect to tenants (e.g., 112, 114, and/or 116) and associated applications, in accordance with the defined security management criteria. Turning to FIGS. 2 and 3 (along with FIG. 1), FIG. 2 depicts a block diagram of an example SMC 124, and FIG. 3 illustrates a block diagram of an example security rules determination flow 300 that can be utilized (e.g., by the SMC 124) to facilitate determining desirable (e.g., suitable, acceptable, enhanced, and/or optimal) security rules that can be used with regard to applications associated with tenant, in accordance with various aspects and embodiments of the disclosed subject matter. As shown in FIG. 2, the SMC 124 can comprise security rule component 202, rule enforcement component 204, a monitor component 206, filter component 208, AI component 210, model component 212, cluster component 214, security group (SG) component 216, interface component 218, metrics component 220, communicator component 222, operations manager component 224, processor component 226, and data store 228.

In some embodiments, with regard to each of the tenants (e.g., 112, 114, and 116), initially (or at another desired point in time where an analysis is to be performed), a tenant can use a communication device (e.g., 118, 120, or 122) to interact with and/or access the cloud network 104, including the application(s) or service(s) the tenant desires to utilize and/or set up. In certain embodiments, the security rule component 202 can enable the tenant (e.g., 112, 114, or 116), using the communication device (e.g., 118, 120, or 122) to select desired security rules to be applied to the resources (e.g., 106, 108, and/or 110), including VMs, and data traffic associated therewith in connection with the application of the tenant. For instance, the tenant can utilize the tenant's knowledge and experience to configure (e.g., manually configure or set) the security rules to be applied to all application instances and associated resources and data traffic. The security rule component 202 can receive the configuration or selection information regarding the security rules from the communication device (e.g., 118, 120, or 122) of the tenant, and the security rule component 202 can configure or set a group of security rules associated with the application and tenant based at least in part on the configuration or selection information received from the tenant (or someone associated with (e.g., acting on behalf of) the tenant).

With regard to the group of security rules selected or configured by a tenant (e.g., 112, 114, or 116), the SMC 124, employing the rule enforcement component 204, can control ingress and egress of respective items of data traffic to and from resources of the group of resources (e.g., 106, 108, and/or 110) initially based at least in part on the group of security rules selected or configured by the tenant (e.g., based at least in part on the application of the group of security rules to the respective items of data traffic and associated group of resources).

As indicated at reference numeral 302 of the example security rules determination flow 300 of FIG. 3, training network data traffic and associated testing network data traffic can be monitored, tracked, collected, and/or observed by the SMC 124. For instance, with regard to each tenant (e.g., 112, 114, or 116), the SMC 124, employing the monitor component 206, can monitor or track activity or interactions associated with the application of the tenant, with such activity or interactions comprising, for example, communication of data traffic between resources (e.g., 106, 108, and/or 110) of the cloud network 104, communication of traffic between resources and the communication network 102 and/or communication devices, and/or other activity or interactions associated with the application associated with the tenant. Based at least in part on the monitoring and tracking, with regard to each tenant (e.g., 112, 114, or 116), the SMC 124 can obtain (e.g., receive, collect, and/or aggregate) information relating to such activity or interactions, including information relating to respective items of data traffic associated with the application and resources (e.g., 106, 108, and/or 110), while the group of security rules associated with the tenant (e.g., 112, 114, or 116) is being applied to the group of resources and associated data traffic and application.

For instance, as part of the monitoring or tracking of the data traffic (e.g., real data traffic associated with the tenant's application) and obtaining the information relating thereto, the SMC 124 can observe actions, such as, for example, netflow traffic with "allow" (e.g., allowance of the ingress or egress of data traffic) and "deny" (e.g., deny ingress or egress of data traffic) from the IP tables for each resource (e.g., for each VM) of the group of resources (e.g., 106, 108, and/or 110). The information relating to respective items of data traffic can indicate, for example, instances where there was a communication or interaction between one resource (e.g., 106) and another resource (e.g., 108) of the cloud network 104, and/or instances where port addresses associated with ports associated with resources (e.g., VMs) are involved in a communication or an interaction with communication devices (e.g., communication devices 118, 120, 122, 126, and/or 128 associated with respective IP addresses) associated with the communication network 102 or other resources of the cloud network 104. In certain embodiments, the SMC 124 can continue to monitor and track the activity or interactions, and obtain information regarding such activity or interactions, associated with the application of the tenant for a desired period of time (e.g., one day, one week, one month, or other desired period of time).

With regard to each tenant (e.g., 112, 114, or 116) and associated application, the SMC 124 can analyze the information relating to such activity or interactions, including the information relating to the respective items of data traffic associated with the application and resources (e.g., 106, 108, and/or 110), to facilitate generating or compiling training data traffic (e.g., training network data traffic) that can be utilized for training AI-based (e.g., ML) models of model component 212. With regard to each tenant (e.g., 112, 114, or 116) and associated application, the SMC 124 can generate or compile a portion of the information relating to such activity or interactions (e.g., information relating to a portion of the data traffic) that can be used as training data traffic and another portion of the information relating to such activity or interactions that can be used as testing data traffic (e.g., testing network data traffic). The SMC 124 can apportion or divide the data traffic to form the training data traffic and the testing data traffic as desired with regard to the size of the data portions (e.g., 90% portion for training data and 10% portion for testing data, or other respectively desired sized portions) and with regard to the period(s) of time of the data utilized. The SMC 124 can determine or select the testing data traffic such that the testing data traffic can be representative of and/or proportional to (e.g., proportional with regard to each type of data traffic to, and/or proportional with regard to data traffic flow to) the training data traffic, so that when the testing data traffic is subsequently utilized to test the performance of security rules, the test results from applying the security rules to the testing data traffic can desirably (e.g., suitably, acceptably, or optimally) correspond to or be representative of, or at least substantially correspond to or be representative of, the results that would be obtained if the security rules were applied to the training data traffic.

In some embodiments, with regard to each tenant (e.g., 112, 114, or 116) and associated application, the SMC 124 can employ the filter component 208 to filter the training data traffic (e.g., training network traffic, including information relating thereto) and testing data traffic (e.g., testing network data traffic) to remove undesired (e.g., outlier, unwanted, irrelevant, redundant, or otherwise undesired) items of data from the training and testing data traffic, as indicated at reference numeral 304 of the example security rules determination flow 300 of FIG. 3. For instance, data traffic can comprise a significant amount of IP scanning data and/or port scanning data, where, with regard to IP scanning, devices or resources can transmit IP packets to other devices or resources to determine what IP protocol(s) is supported by the other devices or resources, and where, with regard to port scanning, devices or resources can transmit client requests to various port addresses of other devices or resources to determine which ports of the other devices or resources are open. The SMC 124 can treat this IP scanning data and/or port scanning data as outlier data or otherwise undesirable data, in accordance with the defined security management criteria, since, for instance, this IP scanning data and/or port scanning data can make up a significant portion of the data traffic (e.g., relative to other types of data traffic), may not be particularly useful to determining desirable security rules, may undesirably skew the training data and, accordingly, and/or may undesirably skew the determining of security rules (e.g., which may result in less desirable security rules). Accordingly, in certain embodiments, the filter component 208 can employ desired filtering tools and algorithms, as part of the analysis of the training data traffic and testing data traffic, to detect information relating to IP scanning and/or port scanning, and/or any other type of undesired information, in the training data traffic and testing data traffic, and can filter out (e.g., remove or delete) information (e.g., data traffic items) relating to IP scanning and/or port scanning, and/or any other type of undesired information, from the training data traffic and testing data traffic, in accordance with the defined security management criteria (e.g., criteria relating to filtering out of undesired data).

In accordance with various embodiments, with regard to each tenant (e.g., 112, 114, or 116) and associated application, and with regard to the information relating to such activity or interactions for a given period of time, the SMC 124 can employ the AI component 210 to perform an AI-based (e.g., AI and/or ML) analysis on the training data (e.g., the filtered training data, comprising the desired portion of the information relating to such activity or interactions) to facilitate training the AI-based models, clustering of related elements (e.g., clustering of respective resources that are determined or inferred to have relationships with each other; and/or clustering of respective network addresses and respective port addresses (e.g., associated with ports associated with resources) determined or inferred to have relationships with each other), and determine desirable security rules to use for the application associated with the tenant, as indicated at reference numeral 306 of the example security rules determination flow 300 of FIG. 3. The SMC 124 can desirably use the filtered training data, while not using the undesired information (e.g., not using the filtered out training data traffic and filtered out testing data traffic) in the AI-based analysis. The AI component 210 can feed (e.g., input) the training data traffic (e.g., the filtered training data traffic) into desired AI-based models of the model component 212 to train the AI-based models to learn patterns associated with the resources (e.g., 106, 108, and/or 110) with regard to the application associated with the tenant, including patterns such as relationships or interactions between respective resources and relationships or interactions between respective resources and the communication network 102 (e.g., the Internet).

With regard to each tenant (e.g., 112, 114, or 116) and associated application, based at least in part on the results of the AI-based analysis of the training data traffic and/or the training of the group of AI-based models by the AI component 210, the AI component 210 can determine or infer respective first relationships between the respective resources (e.g., between respective VMs) and respective second relationships between the respective resources and respective network addresses associated with the communication network 102 and/or the cloud network 104. For instance, based at least in part on the AI-based analysis results, the AI component 210 (e.g., the AI-based models) can determine or infer that a first resource (e.g., 106) has had a relationship or interactions with a second resource (e.g., 108), but has not had any relationship or interaction with another resource; and/or can determine or infer that the first resource (e.g., 106) has had a relationship or interactions with one or more network addresses (e.g., one or more IP addresses) associated with the communication network 102.

With regard to each tenant (e.g., 112, 114, or 116) and associated application, and as a further result of the AI-based analysis and associated AI-based models, the AI component 210 can comprise a cluster component 214 that can cluster respective resources (e.g., 106, 108, and/or 110) into respective subgroups (e.g., clusters) of resources based at least in part on the respective relationships between the respective resources. The SG component 216 can associate respective SGs with the respective subgroups of resources. For instance, the SG component 216 can form respective SGs based at least in part on the respective subgroups of resources. Resources (e.g., VMs) within the same subgroup can communicate data traffic to each other (e.g., a first port associated with a first VM of the subgroup can communicate data traffic to a second port associated with a second VM of the subgroup). Depending in part on the relationships between resources, a resource can be part of one SG, or can be part of multiple SGs. The cluster component 214 can employ (e.g., apply or utilize) desired clustering techniques and algorithms (e.g., graph clustering, agglomerative clustering, and/or other desired clustering techniques or algorithms) to determine, infer, or generate respective clusters of respective resources based at least in part on the AI-based analysis results, including the respective relationships determined or inferred between the respective resources.

In some embodiments, from the AI-based analysis and AI-based models (e.g., trained AI-based models), the cluster component 214 can determine that certain resources can be grouped together to form a subgroup of resources based at least in part on a frequency of communications or interactions between respective resources (e.g., a pattern showing a frequency of communications or interactions between respective resources). For instance, if the cluster component 214 determines that a first resource (e.g., 106) has had a sufficiently high frequency of communications or interactions (e.g., a sufficiently high number of communications or interactions over the defined time period) with a second resource (e.g., 108) that satisfies (e.g., meets or exceeds; or is greater than or equal to) a defined threshold (e.g., defined minimum threshold) frequency of resource communications or interactions, the cluster component 214 can determine that the first resource and the second resource can be grouped together in a same subgroup of resources, in accordance with the defined security management criteria (e.g., criteria relating to frequency of resource communications or interactions, and clustering of resources).

Figure 4:
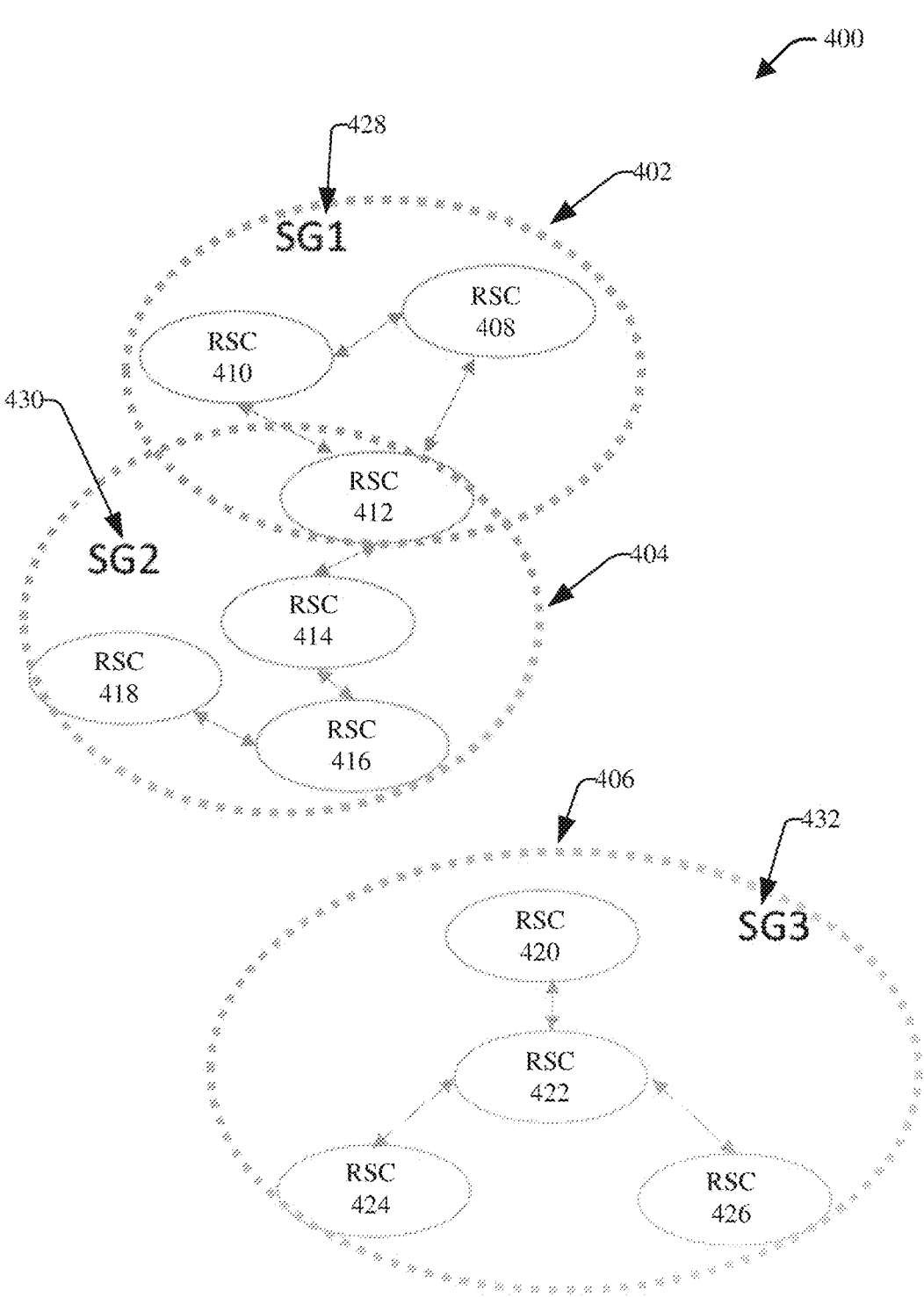
FIG. 4 illustrates a diagram of an example graph comprising and presenting clustering of resources associated with respective security groups, in accordance with various aspects and embodiments of the disclosed subject matter.

Referring to FIG. 4 (along with FIGS. 1, 2, and 3), FIG. 4 illustrates a diagram of an example graph 400 comprising and presenting clustering of resources (e.g., VMs) associated with respective SGs, in accordance with various aspects and embodiments of the disclosed subject matter. In the example graph 400, based at least in part on the AI-based analysis results of the training data traffic (e.g., information comprising or relating to the real data traffic), including the respective relationships determined or inferred between the respective resources (e.g., including the respective frequencies of communications or interactions between respective resources), the cluster component 214 can cluster respective resources into respective subgroups (e.g., clusters) of resources. The respective subgroups of resources can comprise, for example, a first subgroup of resources 402, second subgroup of resources 404, and third subgroup of resources 406, with the first subgroup of resources 402 comprising resources (e.g., VMs) 408, 410, and 412, the second subgroup of resources 404 comprising resources 412, 414, 416, and 418, and the third subgroup of resources 406 comprising resources 420, 422, 424, and 426. The SG component 216 can form (e.g., at least initially form) a first SG 428 (SG1) from the first subgroup of resources 402, a second SG 430 (SG2) from the second subgroup of resources 404, and a third SG 432 (SG3) from the third subgroup of resources 406.

As also can be observed in the example graph 400, the cluster component 214 can group the resources 408, 410, and 412 together to form the first subgroup of resources 402 based at least in part on the AI-based analysis results, including the AI-based models, indicating that resource 408 has relationships with resource 410 (e.g., as indicated by the arrow between resource 408 and resource 410) and resource 412, and resource 410 has a relationship with resource 412 (e.g., as indicated by the arrow between resource 410 and resource 412). As can be further observed in the example graph 400, the cluster component 214 can group the resources 412, 414, 416, and 418 together to form the second subgroup of resources 404 based at least in part on the AI-based analysis results, including the AI-based models, indicating that resource 412 has a relationship with resource 414, resource 414 has a relationship with resource 416, and resource 416 has a relationship with resource 418. It also can be observed that resource 412 can be in both the first subgroup of resources 402 and second subgroup of resources 404. As can be further observed in the example graph 400, the cluster component 214 can group the resources 420, 422, 424, and 426 together to form the third subgroup of resources 406 based at least in part on the AI-based analysis results, including the AI-based models, indicating that resource 420 has a relationship with resource 422, and resource 422 has relationships with resource 424 and resource 426.

In the example graph 400, certain resources (e.g., resource 408) are not grouped with certain other resources (e.g., resource 426) and no relationship (e.g., no arrow) is shown between the certain resources and the certain other resources because, for example, based at least in part on the AI-based analysis results and associated AI-based models, the AI component 210 did not detect or identify a relationship, or at least did not detect or identify a sufficiently strong enough relationship, between the certain resources and the certain other resources (e.g., the AI component 210 did not detect or identify any communication or interaction between the certain resources and the certain other resources, or did not detect or identify a sufficiently high enough frequency of communication or interaction between the certain resources and the certain other resources to satisfy the defined threshold frequency of resource communications or interactions).

It is to be appreciated and understood that, while the example graph 400 contains three subgroups of resources, three SGs, and ten resources, these are just example clustering results, and the disclosed subject matter can determine and generate different clustering results, with respective numbers of resource subgroups, respective numbers of SGs, and respective numbers of resources, as determined or inferred by the AI component 210 based on an AI-based analysis of the particular training data traffic (e.g., real data traffic) obtained by the SMC 124.

In certain embodiments, the SMC 124 and/or AI component 210 can consider and analyze other information, such as metadata associated with resources and applications when determining groupings of resources associated with an application associated with a tenant (e.g., 112, 114, or 116). The SMC 124 and/or AI component 210 can utilize (e.g., analyze) the metadata to supplement the other information described herein during the analysis of the other information to facilitate determining groups of resources associated with an application, and/or to confirm determinations of groups of resources associated with an application that have been made based on the other information described herein. The metadata can comprise, for example, application descriptions running on resources (e.g., VMs) associated with an application and/or the overall application setup architecture for the application. For instance, a tenant associated with an application may include metadata in the form of an application description that can indicate a type of data traffic (e.g., video streaming traffic; or web traffic; or textual data traffic) that a resource associated with the application is communicating or receiving. As another example, the overall application setup architecture (if such metadata is available) for an application can indicate the number of resources (e.g., VMs) utilized by the application, and/or what each of the resources are used for (e.g., a number of resources used as video servers, a number of resources used for one or more websites, a number of databases, and/or other resources used for other purposes of the application) and, correspondingly, the types of data traffic associated with the respective resources. Such metadata can be useful to the SMC 124 and/or AI component 210 when determining groupings of resources associated with an application and/or to confirm a determination (e.g., initial or preliminary determination) of groupings of resources associated with an application, in accordance with the defined security management criteria.

With regard to each tenant (e.g., 112, 114, or 116) and associated application, and as a further result of the AI-based analysis and associated AI-based models, the cluster component 214 also can determine or infer, for each SG (e.g., SG1 428, SG2 430, and/or SG3 432), patterns of respective subgroups of network addresses and port addresses (e.g., port numbers) associated with the respective resources (e.g., 408 through 426) in the respective subgroups of resources (e.g., 402, 404, and/or 406). For each SG (e.g., SG1 428, SG2 430, and/or SG3 432), the respective subgroups of network addresses and port addresses can indicate respective communications or other interactions between, for example, a particular network address and one or more port addresses associated with resources in the SG (e.g., as allowed by the existing security rules (e.g., security rules selected by the tenant)), and a particular port address and one or more network addresses associated with the resources in the SG (e.g., as allowed by the existing security rules).

With regard to each tenant (e.g., 112, 114, or 116) and associated application, and as a further result of the AI-based analysis and associated AI-based models, for each SG (e.g., SG1 428, SG2 430, and/or SG3 432), the cluster component 214 can cluster respective port addresses associated with respective ports (e.g., ports of VMs) that are determined to be associated with a particular network address (e.g., IP address associated with the Internet) into a subgroup of port addresses associated with the particular network address, with regard to one or more network addresses, and/or can cluster respective network addresses that are determined to be associated with a particular port address associated with a port into a subgroup of network addresses associated with the particular port address, with regard to one or more port addresses, in accordance with the defined security management criteria.

The cluster component 214 can employ (e.g., apply or utilize) desired clustering techniques and algorithms (e.g., graph clustering, agglomerative clustering, and/or other desired clustering techniques or algorithms) to determine, infer, or generate respective clusters of respective network addresses and respective port addresses (e.g., associated with respective resources, such as VMs, associated with the SG) based at least in part on the AI-based analysis results, including the respective relationships determined or inferred between the respective network addresses and respective port addresses. In some embodiments, from the AI-based analysis and AI-based models (e.g., trained AI-based models), with regard to an SG (e.g., SG1 428, SG2 430, or SG3 432), the cluster component 214 can determine that certain port addresses can be associated with (e.g., can have a relationship with) a particular network address(es) and can be grouped together to form a subgroup of port addresses associated with the particular network address(es) based at least in part on a frequency of communications or interactions between those certain port addresses (e.g., associated with resources, such as VMs) and the particular network address(es) and/or based at least in part on other character-
istics associated with the resources associated with the SG,
such as described herein. For instance, if the cluster com-
ponent 214 determines that the certain port addresses asso-
ciated with certain ports of the resources associated with an
SG have each had a sufficiently high frequency of commu-
nications or interactions (e.g., a sufficiently high number of
communications or interactions over the defined time
period) with the particular network address that satisfies
(e.g., meets or exceeds; or is greater than or equal to) a
defined threshold (e.g., defined minimum threshold) fre-
quency of communications or interactions between port
addresses and a network address, the cluster component 214
can determine that the certain port addresses associated with
the particular network address(es) can be grouped together
in a same subgroup of port addresses associated with the
particular network address(es), in accordance with the
defined security management criteria (e.g., criteria relating
to frequency of communications or interactions between
port addresses and a network address, and clustering of port
addresses associated with a network address).

In certain embodiments, correspondingly, as a further
result of the AI-based analysis and AI-based models, with
regard to an SG (e.g., SG1 428, SG2 430, or SG3 432), the
cluster component 214 can determine that certain network
addresses can be associated with a particular port
address(es) associated with a port(s) (e.g., port address
associated with VMs associated with the SG) and can be
grouped together to form a subgroup of network addresses
associated with the particular port address(es) based at least
in part on a frequency of communications or interactions
between those certain network addresses and the particular
port address(es) and/or other characteristics associated with
the resources associated with the SG, such as described
herein.

Figure 5:
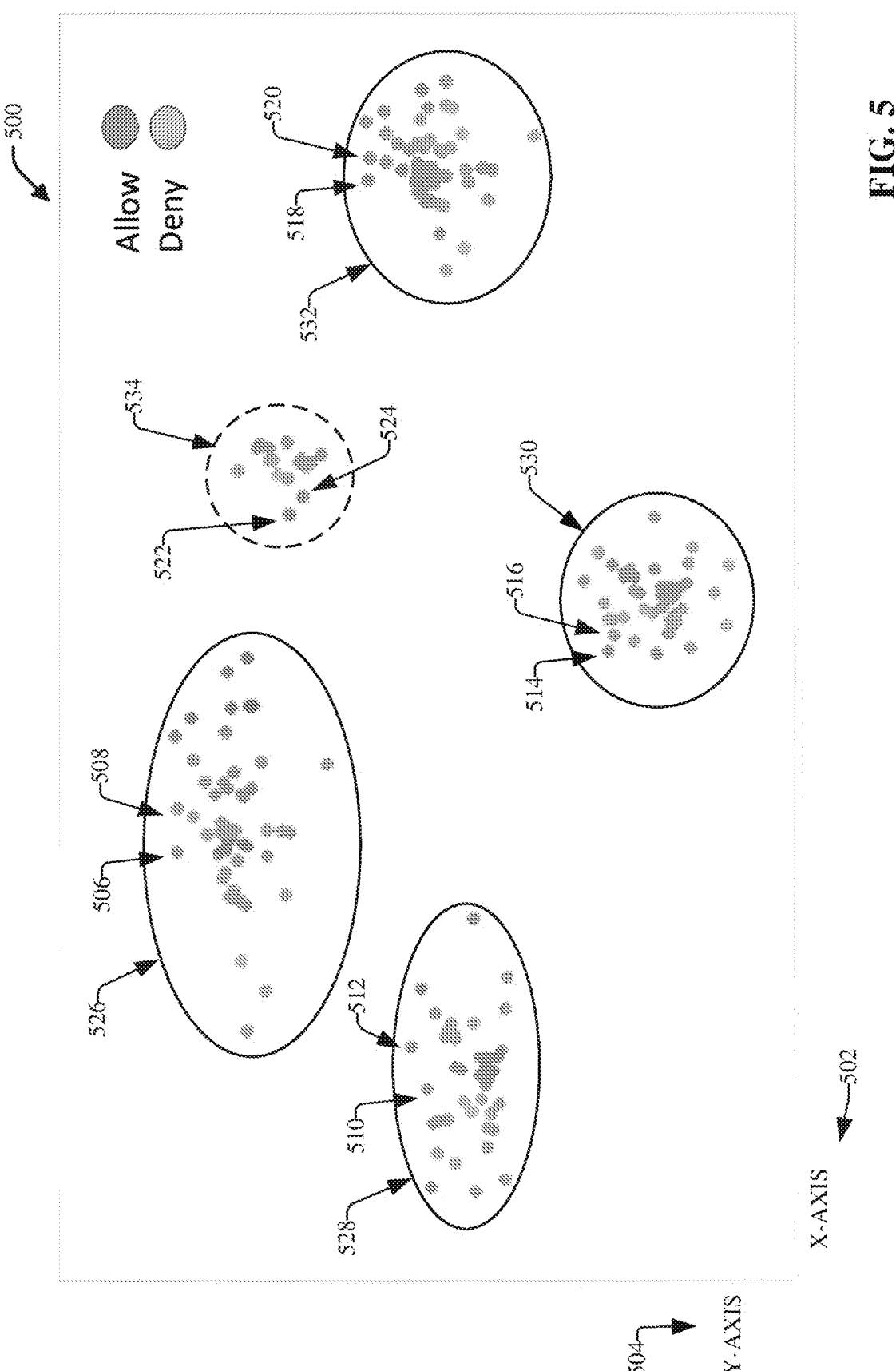
FIG. 5 illustrates a diagram of an example graph of graphing and clustering of data sessions associated with network addresses and ports to facilitate network address and port clustering relating to resource (e.g., VM) data traffic within the security group, in accordance with various aspects and embodiments of the disclosed subject matter.

To facilitate illustrating such clustering relating to net-
work addresses and port addresses for an SG, turning to FIG.
5 (along with FIGS. 1, 2, 3, and 4), FIG. 5 illustrates a
diagram of an example graph 500 of graphing and clustering
of data sessions associated with network addresses (e.g., IP
addresses) and ports (e.g., ports associated with resources of
an SG) to facilitate network address and port clustering
relating to resource (e.g., VM) data traffic within the SG, in
accordance with various aspects and embodiments of the
disclosed subject matter. In the example graph 500, based at
least in part on the AI-based analysis results of the training
data traffic (e.g., information comprising or relating to the
real data traffic), including the determining, identifying, or
inferring of respective characteristics (e.g., attributes) asso-
ciated with respective data sessions, comprising respective
data traffic, the AI component 210 (e.g., employing one or
more AI-based models) can plot, on the example graph 500,
respective data points that can represent respective data
sessions associated with the data traffic.

In accordance with various embodiments, the x-axis 502
of the graph 500 can be or can relate to a first factor or a first
attribute score (e.g., single attribute score, or composite or
combined attribute score) relating to one or more charac-
teristics (e.g., attributes; or an aspect(s) or feature(s) of the
one or more characteristics) associated with the data ses-
sions, and the y-axis 504 of the graph 500 can be or can
relate to a second factor or a second attribute score relating
to one or more characteristics (e.g., one or more other
characteristics; or another aspect(s) or feature(s) of the one
or more characteristics) associated with the data traffic of the
data sessions. The SMC 124 and/or AI component 210 can
determine the respective characteristics associated with the
respective data traffic of the respective data sessions based at least in part on the result of analyzing the data traffic and
the information relating to the data traffic. The characteris-
tics can comprise, for example, a type of data traffic (e.g.,
streaming video traffic, web traffic, phone call, textual data
traffic, or other type of data traffic), a packet size of data
packets of a data session, a packet interval (e.g., a length of
time between consecutive data packets), session duration of
a data session, a protocol (e.g., communication protocol)
associated with (e.g., used by or otherwise associated with)
a data session, a network address associated with a data
session, a port (e.g., port address or number of the port)
associated with a data session, a frequency of communica-
tions or interactions between a network address and a port
address, and/or another desired characteristic associated
with a data session. As a further result of the AI-based
analysis, the AI component 210 can infer or determine the
respective relationships between respective network
addresses and respective port addresses (e.g., including the
respective frequencies of communications or interactions
between the respective network addresses and respective
port addresses), such as described herein.

The respective data sessions associated with the data
traffic (e.g., the respective data points representative of the
respective data sessions) can comprise, for example, data
session 506, data session 508, and the other data sessions in
proximity to data sessions 506 and 508; data session 510,
data session 512, and the other data sessions in proximity to
data sessions 510 and 512; data session 514, data session
516, and the other data sessions in proximity to data sessions
514 and 516; data session 518, data session 520, and the
other data sessions in proximity to data sessions 518 and
520; and data session 522, data session 524, and the other
data sessions in proximity to data sessions 522 and 524. The
data sessions 506, 508, 510, 512, 514, 516, 518, and 520,
and the other data sessions respectively in proximity thereto,
can be data sessions that were allowed under the existing
security rules (e.g., the initial security rules selected by the
tenant). The data sessions 522 and 524, and the other data
sessions in proximity to data sessions 522 and 524, can be
data sessions that comprise data traffic that was denied under
the existing security rules.

The AI component 210 can plot certain respective data
sessions (e.g., data sessions 506 and 508, and the other data
sessions in proximity thereto; data sessions 510 and 512, and
the other data sessions in proximity thereto; data sessions
514 and 516, and the other data sessions in proximity
thereto; data sessions 518 and 520, and the other data
sessions in proximity thereto; and data sessions 522 and 524,
and the other data sessions in proximity thereto) in proxim-
ity to each other on the example graph 500 based at least in
part on inferring or determining that the certain respective
data sessions have respective characteristics that are suffi-
ciently or substantially same as or similar to each other, in
accordance with the defined security management criteria.
For instance, the AI component 210 can plot a pair of data
sessions (e.g., data session 506 and data session 508) in
relatively close proximity to each other on the example
graph 500 (e.g., as compared to other data sessions, such as
data sessions 510 through 524) based at least in part on
inferring or determining that the respective packet sizes of
data packets of the pair of data sessions are sufficiently or
substantially the same as or similar to each other, the
respective packet intervals associated with data packets of
the pair of data sessions are sufficiently or substantially the
same as or similar to each other, the respective session
durations of the pair of data sessions are sufficiently or
substantially the same as or similar to each other, the respective protocols associated with the pair of data sessions are sufficiently or substantially the same as or similar to each other, and/or other respective characteristic values associated with the pair of data sessions sufficiently or substantially the same as or similar to each other.

For example, if data session 506 has a data packet size that is relatively large and/or the session duration is relatively long in time length, this can indicate (e.g., to the AI component 210) that the data traffic of the data session 506 can be, or potentially can be, streaming video traffic. If the AI component 210 determines that the data session 508 has a data packet size that also is relatively large, and is the same size as or substantially similar in size to the data packet size associated with the data session 506, and/or determines that the session duration of the data session 508 is relatively long, and is the same as or similar to the session duration of the data session 506, the AI component 210 can infer or determine that the data traffic of the data session 508 can be, or potentially can be, streaming video traffic as well, and/or can infer or determine that the data session 506 and data session 508 are similar to each other with regard to packet size and/or session duration.

As another example, if a data session 514 has a data packet size that is relatively small and/or the session duration is relatively short in time length, this can indicate (e.g., to the AI component 210) that the data traffic of the data session 514 can be, or potentially can be, a relatively lower bandwidth type of traffic (e.g., communication of textual information and/or relatively smaller data-sized visual images, or a phone call), as opposed to streaming video traffic, which typically can utilize a relatively higher bandwidth. If the AI component 210 determines that the data session 516 has a data packet size that also is relatively small, and is the same size as or substantially similar in size to the data packet size associated with the data session 514, and/or determines that the session duration of the data session 516 is relatively short, and is the same as or similar to the session duration of the data session 514, the AI component 210 can infer or determine that the data traffic of the data session 516 can be, or potentially can be, a relatively lower bandwidth type of traffic as well, and/or can infer or determine that the data session 514 and data session 516 are similar to each other with regard to packet size and/or session duration.

Based at least in part on the respective characteristics associated with the respective data traffic of the respective data sessions and/or the plotting of the respective data sessions on the example graph 500, the cluster component 214 can determine or infer respective clusters of respective data sessions, in accordance with the defined security management criteria. For instance, the cluster component 214, employing a clustering algorithm and/or another desired AI-based algorithm, can determine or infer a portion of the data sessions that have sufficiently same or similar characteristics to each other (e.g., a portion of the data sessions that are in relatively close proximity to each other on the graph 500 as compared to the locations of other data sessions on the graph 500), and can cluster the portion of the data sessions together to form a subgroup of data sessions. The cluster component 214 can continue such clustering of data sessions to form respective subgroups of data sessions associated with respective characteristics. For example, with regard to the data sessions plotted on the graph 500, the cluster component can cluster data sessions 506 and 508, and the other data sessions in proximity thereto, to form cluster 526; can cluster data sessions 510 and 512, and the other data sessions in proximity thereto, to form cluster 528;

can cluster data sessions 514 and 516, and the other data sessions in proximity thereto, to form cluster 530; and can cluster data sessions 518 and 520, and the other data sessions in proximity thereto, to form cluster 532. In some embodiments, the cluster component 214 also can cluster data sessions 522 and 524 (e.g., data sessions relating to denied data traffic), and the other data sessions in proximity thereto, to form cluster 534.

The SMC 124, employing the security rule component 202, can utilize the cluster-related information relating to the clusters (e.g., clusters 526, 528, 530, 532, and/or 534), and associated subgroups of data sessions, to determine desirable (e.g., suitable, balanced, secure, enhanced, and/or optimal) security rules that can be used for the SG (e.g., that can be applied to the resources associated with the SG, and data traffic associated with the resources), in accordance with the defined security management criteria. In connection with determining the security rules for the SG (e.g., SG1 428, SG2 430, or SG3 432), with regard to each cluster (e.g., clusters 526, 528, 530, 532, or 534), the security rule component 202 can determine or identify the one or more network addresses and the one or more port addresses associated with the data sessions of the subgroup of data sessions associated with (e.g., that are part of) the cluster. Since each data session can be associated with a network address and a port address, the clustering of a portion of data sessions to form a cluster of data sessions (e.g., by the cluster component 214) also can result in a cluster of one or more network addresses and one or more port addresses associated with the data sessions that are part of that cluster of data sessions. For each cluster (e.g., clusters 526, 528, 530, or 532), except cluster 534, the security rule component 202 can determine one or more security rules that can indicate the one or more network addresses and the one or more port addresses between which data traffic is allowed to be communicated, wherein the one or more port addresses can be associated with the resources of the subgroup of resources associated with the SG (e.g., SG1 428, SG2 430, or SG3 432).

In some embodiments, the security rules, and the application of security rules, can be structured such that, if a security rule indicates or specifies that data traffic can be allowed to be communicated between a particular network address(es) and a particular port address(es), the data traffic can be permitted to be communicated between the particular network address(es) and the particular port address(es), and other data traffic associated with a different network address(es) and/or a different port address(es) can be denied by default when not specified as being allowed (e.g., as the security rule can be enforced by the rule enforcement component 204). In other embodiments, the security rules, and the application of security rules, can be structured such that there can be a first type of security rules (e.g., allowable data traffic security rules) that can affirmatively indicate when data traffic is permitted to be communicated between a particular network address(es) and a particular port address(es) and a second type of security rules (e.g., denied data traffic security rules) that can affirmatively indicate when data traffic is not permitted to be communicated between a particular network address(es) and a particular port address(es). With regard to the latter case, if the second type of security rules is being employed (along with the first type of security rules), for cluster 534, the security rule component 202 can determine or identify one or more network addresses and one or more port addresses associated with the data sessions of the subgroup of data sessions associated with the cluster 534 for which data traffic had been denied, and the security rule component 202 can determine one or more security rules that can indicate the one or more network addresses and the one or more port addresses between which data traffic is not allowed to be communicated.

As an alternative to, or in addition to, the example clustering illustrated in the example graph 500 of FIG. 5, in certain embodiments, if the cluster component 214 determines that the certain network addresses (e.g., similarly or closely numbered network addresses; contiguously or substantially contiguously numbered network addresses; and/or network addresses associated with a same subnet mask) associated with an SG (e.g., SG1 428, SG2 430, or SG3 432) have each had a sufficiently high frequency of communications or interactions (e.g., a sufficiently high number of communications or interactions over the defined time period) with the particular port address that satisfies (e.g., meets or exceeds; or is greater than or equal to) a defined threshold (e.g., defined minimum threshold) frequency of communications or interactions between network addresses and a port address, the cluster component 214 can determine that the certain network addresses associated with the particular port address can be grouped together in a same subgroup of network addresses associated with the particular port address, in accordance with the defined security management criteria (e.g., criteria relating to frequency of communications or interactions between network addresses and a port address, and clustering of network addresses associated with a port address). For example, the cluster component 214 can utilize an agglomerative clustering technique and algorithm to merge similar network addresses associated with a particular port address from the bottom up to facilitate creating a subgroup of such network addresses associated with the particular port address associated with a port associated with a resource.

Figure 6:
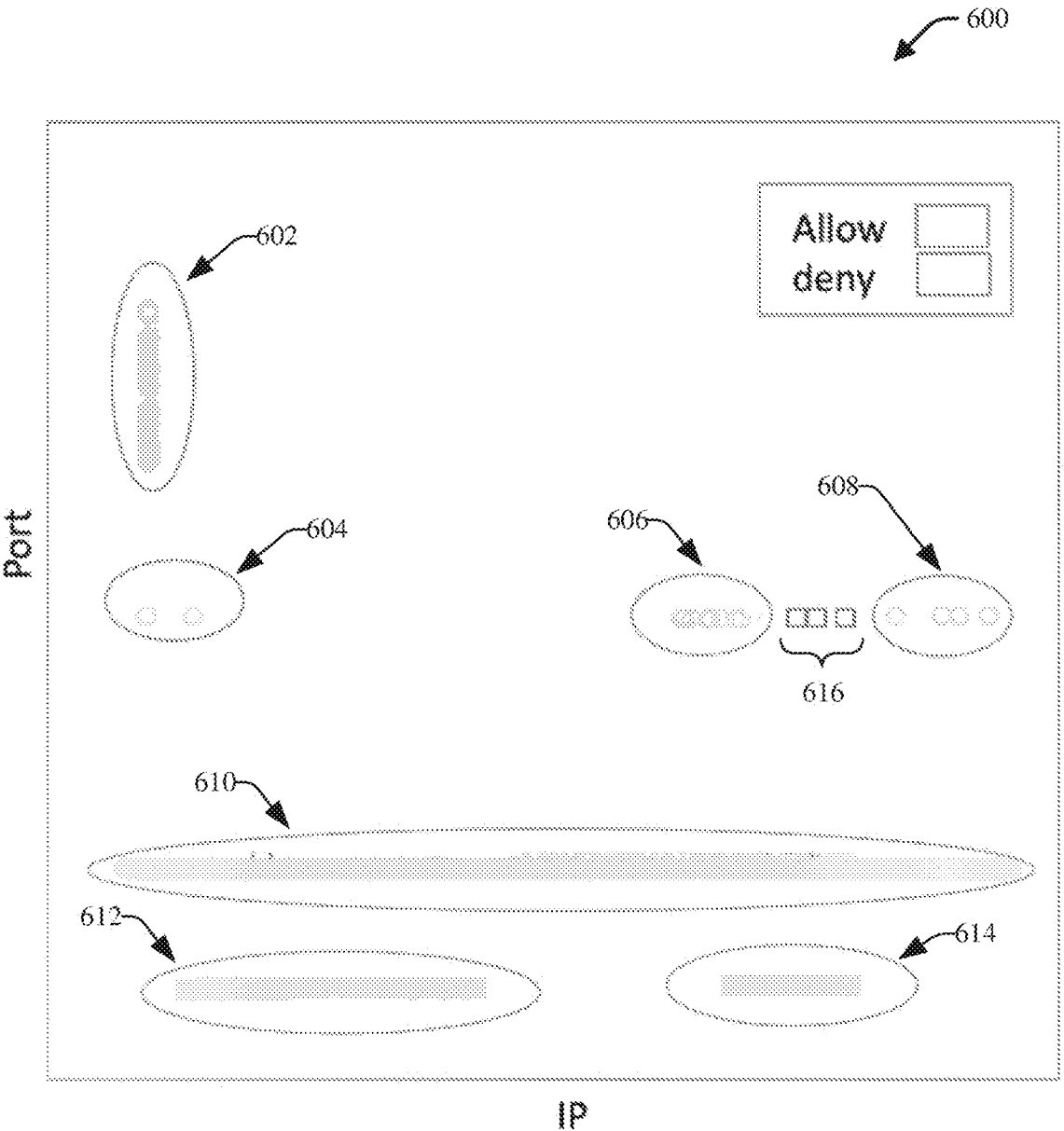
FIG. 6 depicts a diagram of an example graph of Internet protocol (IP) address and port clustering relating to resource (e.g., VM) traffic within a security group, in accordance with various aspects and embodiments of the disclosed subject matter.

To facilitate illustrating such clustering relating to network addresses and port addresses for an SG (e.g., SG1 428, SG2 430, or SG3 432), turning to FIG. 6 (along with FIGS. 1, 2, 3, and 4), FIG. 5 depicts a diagram of an example graph 600 of IP address and port clustering relating to resource (e.g., VM) traffic within an SG, in accordance with various aspects and embodiments of the disclosed subject matter. The example graph 600 can comprise and present data points representing communications or interactions between network addresses, with regard to respective network addresses along the x-axis, and port addresses, with regard to respective port addresses along the y-axis.

In the example graph 600, based at least in part on the AI-based analysis results of the training data traffic (e.g., information comprising or relating to the real data traffic), including the respective relationships determined or inferred between the respective network addresses and respective port addresses (e.g., including the respective frequencies of communications or interactions between the respective network addresses and respective port addresses), the cluster component 214 can cluster respective port addresses associated with a particular network address (e.g., for one or more network addresses) into respective subgroups (e.g., clusters) of port addresses associated with a particular network address, and/or can cluster respective network addresses associated with a particular port address (e.g., for one or more port addresses) into respective subgroups (e.g., clusters) of network addresses associated with a particular port address, in accordance with the defined security management criteria, including, for example, the associated applicable defined threshold frequency(ies) of communications or interactions between network addresses and port addresses. With regard to an example SG (e.g., SG1 428, SG2 430, or SG3 432) associated with a subgroup of resources, the respective subgroups relating to network addresses and port addresses of the example graph 600 can comprise, for example, subgroup of first port addresses associated with a first network address 602, subgroup of second network addresses associated with a second port address 604, subgroup of third network addresses associated with the second port address 606, subgroup of fourth network addresses associated with the second port address 608, subgroup of fifth network addresses associated with a third port address 610, subgroup of sixth network addresses associated with a fourth port address 612, and subgroup of seventh network addresses associated with the fourth port address 614.

It is noted that one or more of the resources (e.g., VMs) associated with an SG can or may have had communications or interactions with one or more network addresses associated with the communication network 102 (e.g., communications or interactions with one or more communication devices using the one or more network addresses and associated with the communication network 102); one or more of the resources associated with an SG may not have had communications or interactions with any network addresses associated with the communication network 102; one or more of the resources associated with an SG can or may have had communications or interactions with one or more network addresses associated with the communication network 102, and also can or may have had communications or interactions with another resource (e.g., associated with the same SG or a different SG) that can or may have had communications or interactions with one or more network addresses associated with the communication network 102; and/or one or more of the resources associated with an SG may not have had communications or interactions with any network addresses associated with the communication network 102, but may have had communications or interactions with another resource (e.g., associated with the same SG or a different SG) that can or may have had communications or interactions with one or more network addresses associated with the communication network 102.

As can be observed in the graph 600, the subgroup of first port addresses associated with a first network address 602 can comprise a significant number of port addresses associated with respective ports of resources (e.g., first port addresses having relatively higher port address numbers) that can be associated with (e.g., can be determined or inferred to have a relationship with) the first network address and can be similarly or closely numbered to each other. As also can be observed in the graph 600, the subgroup of second network addresses associated with a second port address 604 can comprise only two network addresses that can be associated with the second port address and can be similarly or closely numbered to each other.

As further can be observed in the graph 600, the subgroup of third network addresses associated with the second port address 606 can comprise a relatively small number of network addresses (e.g., third network addresses) that can be associated with the second port address and can be similarly or closely numbered to each other, and the subgroup of fourth network addresses associated with the same second port address 608 also can comprise a relatively small number of network addresses (e.g., fourth network addresses) that can be associated with the same second port address and can be similarly or closely numbered to each other. With regard to the second port address, in between the third network addresses and the fourth network addresses, there can be a relatively small number of network addresses 616 (e.g., eighth network addresses) where communication (e.g., communication of data traffic) or interaction with the second port address (e.g., associated with a VM(s) of the SG) has been denied (e.g., based on application of the existing security rules, as selected by the tenant). Such denial of communication or interaction between such relatively small number of network addresses 616 and the second port address, with those network addresses 616 being situated (e.g., located) between the third network addresses and the fourth network addresses, can be at least one of the reasons that the cluster component 214 determined that subgroup 606 and subgroup 608 should be separate clusters of respective network addresses associated with the second port address.

As also can be observed in the graph 600, the subgroup of fifth network addresses associated with a third port address 610 can comprise a relatively large number of network addresses (e.g., fifth network addresses) that can be associated with the third port address and can be similarly or closely numbered to each other. As further can be observed in the graph 600, the subgroup of sixth network addresses associated with a fourth port address 612 can comprise a relatively large number of network addresses (e.g., sixth network addresses) that can be associated with the fourth port address and can be similarly or closely numbered to each other, although the number of sixth network addresses can be less than the number of fifth network addresses of the subgroup of fifth network addresses associated with a third port address 610. As is also presented in the graph 600, the subgroup of seventh network addresses associated with the fourth port address 614 can comprise a relatively smaller number of network addresses (e.g., seventh network addresses) that also can be associated with the fourth port address and can be similarly or closely numbered to each other.

With regard to each SG (e.g., SG1 428, SG2 430, or SG3 432) and associated subgroup of resources, the SMC 124 can determine security rules associated with the SG based at least in part on clustering-related information relating to the clustering of resources and clustering of network addresses and port addresses, in accordance with the defined security management criteria, such as more fully described herein. For example, with regard to the subgroup of fifth network addresses associated with a third port address 610, the SMC 124, employing the security rule component 202, can determine a first security rule relating to network addresses (e.g., subgrouping of certain network addresses) that can indicate or specify that data traffic from the certain network addresses (e.g., the fifth network addresses) can be allowed to ingress to (e.g., allowed to be communicated or delivered to and received by) a port associated with the third port address (e.g., a security rule that indicates or specifies IP addresses 10.1.2.3/16 port 22 ALLOW). Based at least in part on the first security rule (e.g., as enforced by the rule enforcement component 204 of the SMC 124), data traffic communicated from the fifth network addresses (e.g., data traffic communicated by communication devices using network addresses of the fifth network addresses) can be received by the third port address associated with the port associated with the subgroup of resources associated with the SG; and data traffic communicated using other network addresses, which are not part of the fifth network addresses, can be denied ingress to the third port address associated with the port associated with the subgroup of resources associated with the SG.

As another example, with regard to the subgroup of sixth network addresses associated with a fourth port address 612 and/or the subgroup of seventh network addresses associated with the fourth port address 614, the security rule component 202 can determine a second security rule relating to network addresses that can indicate or specify that data traffic from the sixth network addresses can be allowed to ingress to (e.g., allowed to be communicated or delivered to and received by) a different port (e.g., a different port associated with the subgroup of resources associated with the SG) that is associated with the fourth port address. As still another example, with regard to the subgroup of seventh network addresses associated with the fourth port address 614, the security rule component 202 can determine a third security rule relating to network addresses that can indicate or specify that data traffic from the seventh network addresses can be allowed to ingress to (e.g., allowed to be communicated or delivered to and received by) the different port (e.g., different port associated with the subgroup of resources associated with the SG) associated with the fourth port address.

As yet another example, with regard to the subgroup of first port addresses associated with a first network address 602, the security rule component 202 can determine a fourth security rule relating to port addresses that can indicate or specify that data traffic from the first network address can be allowed to ingress to (e.g., allowed to be communicated or delivered to and received by) the ports (e.g., ports associated with the subgroup of resources associated with the SG) associated with the first port addresses (e.g., a security rule, such as a port security rule, that can indicate or specify 10.1.2.3 port 3000-4000 ALLOW). Based at least in part on the fourth security rule (e.g., as enforced by the rule enforcement component 204 of the SMC 124), data traffic communicated from the first network addresses (e.g., data traffic communicated by communication devices using the first network address) can be received by ports (e.g., ports associated with the subgroup of resources associated with the SG) that are associated with the first port addresses; and data traffic communicated using network addresses, other than the first network address, can be denied ingress at the first port addresses associated with the ports associated with the subgroup of resources associated with the SG. As desired, the security rule component 202 also can determine one or more other security rules based at least in part on the cluster-related information.

At this point, the AI component 210, employing the model component 212 and cluster component 214, has created various different clusters (e.g., clusters of resources, clusters of network addresses and port addresses) for consideration and acceptance or adaptation by the tenant (e.g., 112, 114, or 116). While the AI component 210 created various different clusters, a decision can be made by the tenant (e.g., 112, 114, or 116) regarding whether to accept the clusters, as created by the AI component 210, or whether a change is to be made to the number of clusters or to other aspects of the clusters.

To facilitate enabling the tenant (e.g., 112, 114, or 116) to make an informed decision, as indicated at reference numeral 308 of the example security rules determination flow 300 of FIG. 3, in accordance with various embodiments, the SMC 124 can provide (e.g., communicate or present via the interface component 218) a summary or synthesis of the cluster-related information relating to the various different clusters (e.g., clusters of resources, clusters of network addresses and port addresses) created by the AI component 210 and/or associated security rules determined and generated based at least in part on translating or transforming the cluster-related information into corresponding security rules, in accordance with the defined security management criteria. The security rules can be a modified group of security rules (e.g., rules modified from the tenant-selected security rules) associated with the application associated with the tenant (e.g., 112, 114, or 116), wherein the security rule component 202 can determine the modified group of security rules based at least in part on the cluster-related information and/or other desired information, and the defined security management criteria. The modified group of security rules can comprise respective subgroups of security rules that can be associated with (e.g., applicable to) respective SGs and associated respective subgroups of resources (e.g., 106, 108, and/or 110; and/or 408, 410, 412, 414, . . . , 422, 424, and/or 426) of the cloud network 104. The security rules can specify, for example, whether or not a resource (e.g., 106, 108, and/or 110; and/or 408, 410, 412, 414, . . . , 422, 424, and/or 426) can communicate data traffic to a particular resource; whether or not a port associated with a resource can be permitted to receive items of data traffic and/or particular types of items of data traffic from a particular network address; whether or not a port associated with a resource can be permitted to transmit items of data traffic and/or particular types of items of data traffic to a particular network address; and/or other routing of data traffic and/or interactions between resources or between network addresses and ports associated with resources.

In some embodiments, the SMC 124 can provide (e.g., via the interface component 218) the summary or synthesis of the cluster-related information relating to the various different clusters, comprising clustering results, to the tenant (e.g., 112, 114, or 116) via a communication device (e.g., 118, 120, or 122) associated with the tenant, initially without providing the modified group of security rules, wherein the SMC 124 can receive feedback information relating to desired changes to the clusters from the tenant via the communication device associated with the tenant, and wherein the security rule component 202 can determine the modified group of security rules based at least in part on the clustering-related information and the feedback information comprising the changes (e.g., adaptations), if any, the tenant has decided to make to the clusters. In other embodiments, the SMC 124 can provide (e.g., via the interface component 218) the summary or synthesis of the cluster-related information relating to the various different clusters and the modified (e.g., an initial or recommended version of modified) group of security rules to the tenant (e.g., 112, 114, or 116) via the communication device (e.g., 118, 120, or 122) associated with the tenant, wherein the SMC 124 can receive feedback information relating to desired changes (if any) to the clusters and/or the security rules from the tenant via the communication device associated with the tenant, and wherein the security rule component 202 can determine and/or adapt the modified (e.g., the adapted version of the modified) group of security rules based at least in part on the clustering-related information, the initial version of the modified group of security rules and the feedback information comprising the changes (e.g., adaptations), if any, the tenant has made to the clusters and/or security rules.

In any case (whether or not an initial version of the modified group of security rules is provided to the tenant at this point), the tenant (e.g., 112, 114, or 116) can review the cluster-related information relating to the various different clusters and/or (if provided) the initial version of the modified group of security rules. If and as desired, the tenant (e.g., 112, 114, or 116) can make changes to the various different clusters, such as by changing the number of clusters (e.g., change the number of clusters of resources and thereby the number of SGs) and/or changing the elements or members of a cluster to see if there is a cluster-related change or different version of the clusters that the tenant views as good, according to the knowledge and experience of the tenant. A change to the elements or members of a cluster can comprise, for example, changing a cluster of resources to remove or add a resource from or to the cluster; dividing a cluster of resources into two separate clusters of resources; joining two clusters of resources together to form one cluster of resources; changing a cluster of network addresses associated with a port address to remove or add a network address from or to such cluster; changing a cluster of port addresses associated with a network address to remove or add a port address from or to such cluster; and/or another desired change.

The decision with regard to clustering and the associated (e.g., corresponding) security rules by the tenant (e.g., 112, 114, or 116) can be balanced between risk and accessibility, and can be based at least in part on the tenant's knowledge and experience in managing and securing network data traffic, the application, and associated resources. The more open and permissive the security rules are, generally, the more risk (e.g., risk of an undesired and/or malicious attack occurring with regard to the data traffic and associated resources) involved, as, for example, the most permissive security rule can open a cluster of elements to the entire Internet, whereas, the less open (e.g., the more restrictive) a security rule(s) associated with a cluster is, generally, the more likely the security rule(s) can undesirably deny future unseen legitimate and/or otherwise desired data traffic. For instance, with regard to the latter case (e.g., involving a more restrictive security rule), if a security rule associated with a cluster of elements (e.g., group of VMs) is too restrictive, and if a new VM is added to the cloud network 104, data traffic (e.g., legitimate and/or desired data traffic) communicated from the new VM to the group of VMs can or may be undesirably denied by the VMs of the group of VMs due to the more restrictive security rule.

Once the tenant has (e.g., 112, 114, or 116) has provided feedback, and the SMC 124 has determined and generated (e.g., created) the modified group of security rules, comprising the respective subgroups of security rules associated with the respective SGs, the SMC 124 can test the modified group of security rules to see how well those security rules perform. As indicated at reference numerals 310 and 312 of the example security rules determination flow 300 of FIG. 3, the SMC 124, employing the metrics component 220, can apply the modified group of security rules to the group of resources (e.g., 106, 108, and/or 110; and/or 408, 410, 412, 414, . . . , 422, 424, and/or 426) associated with the application and the testing data traffic (e.g., testing data traffic obtained from real network data traffic), and can determine metrics (e.g., performance metrics) relating to how well the modified group of security rules perform, which can indicate how well the modified group of security rules can perform on future real network data traffic associated with the group of resources and the application associated with the tenant (e.g., 112, 114, or 116). For instance, the metrics component 220 can apply the testing data traffic to the respective subgroups of resources associated with the respective SGs, in connection with applying the respective subgroups of security rules associated with the respective SGs to the respective subgroups of resources and the testing data traffic being applied thereto. The metrics component 220 can determine, generate, or obtain test result information relating to the results of such testing of the modified group of security rules. The test result information can indicate the respective items of test data traffic that were communicated between respective resources, the respective items of test data traffic that were communicated between a port address of a port of a resource to a network address associated with the communication network 102, the respective items of test data traffic that were denied ingress to a port address of a port of a resource from another resource or a network address, the respective items of test data traffic that were denied egress from a port address of a port of a resource to another resource or a network address, and/or other desired (e.g., useful, relevant, or wanted) test result information.

As indicated at reference numeral 314 of the example security rules determination flow 300 of FIG. 3, the metrics component 220 (and/or the tenant (e.g., 112, 114, or 116)) can evaluate the test result information to determine whether the modified group of security rules satisfies the defined security management criteria (e.g., with regard to accuracy of allowance and denial of ingress or egress of data traffic) and/or whether the tenant is satisfied with the performance of the modified group of security rules (e.g., based at least in part on security rule testing feedback information received from the tenant. Based at least in part on the results of the evaluation of the test result information, the metrics component 220 can determine, calculate, and/or generate desired performance metrics, comprising, for example, an allowance quality metric and a denial quality metric, that can indicate how well the modified group of security rules associated with the application associated with the tenant (e.g., 112, 114, or 116) are performing with regard to allowance or denial of ingress or egress of data traffic to or from the resources (e.g., 106, 108, and/or 110; and/or 408, 410, 412, 414, . . . , 422, 424, and/or 426) associated with the application. For instance, based at least in part on the results of the evaluation of the test result information, the metrics component 220 can determine, calculate, and/or generate an allowance quality metric that can relate to, indicate, or specify the quality or accuracy of the allowance of ingress and egress of items of data traffic to or from respective resources associated with respective SGs based at least in part on application of the respective subgroups of security rules to the respective resources of the respective subgroups. The allowance quality metric can indicate how much data traffic was properly allowed to ingress to or egress from the resources and how much data traffic was improperly or mistakenly allowed to ingress to or egress from the resource, and/or can indicate which SGs or which security rules are associated with the improper or mistaken allowance of data traffic. Also, based at least in part on the results of the evaluation of the test result information, the metrics component 220 can determine, calculate, and/or generate a denial quality metric that can relate to, indicate, or specify the quality or accuracy of the denial of ingress and egress of items of data traffic to or from respective resources associated with respective SGs based at least in part on application of the respective subgroups of security rules to the respective resources of the respective subgroups. The denial quality metric can indicate how much data traffic was properly denied ingress to or egress from the resources and how much data traffic was improperly or mistakenly denied ingress to or egress from the resource, and/or can indicate which SGs or which security rules are associated with the improper or mistaken denial of data traffic.

As indicated at reference numeral 316 of the example security rules determination flow 300 of FIG. 3, if the metrics (e.g., allowance quality metric, denial quality metric, or other desired performance metric) are determined to be sufficiently good (e.g., determined to satisfy (e.g., meet or exceed) the defined security management criteria and/or the desires (e.g., wants or requirements) of the tenant (e.g., 112, 114, or 116)), the SMC 124 can determine that the modified group of security rules associated with the group of resources (e.g., 106, 108, and/or 110; and/or 408, 410, 412, 414, . . . , 422, 424, and/or 426) and associated with the tenant can be applied without further changes to the security rules or SGs, and the SMC 124 can apply the modified group of security rules to future data traffic associated with the application associated with the tenant.

As indicated at reference numeral 318 of the example security rules determination flow 300 of FIG. 3, if, instead, the metrics are determined to not be good enough (e.g., determined to not satisfy the defined security management criteria and/or the desires of the tenant), the SMC 124 can determine that the modified group of security rules are not to be applied, as is, and further adaptations are to be made to the security rules, SGs, and/or clustering associated with resources (e.g., 106, 108, and/or 110; and/or 408, 410, 412, 414, . . . , 422, 424, and/or 426) associated with the application. In such case, the tenant (e.g., 112, 114, or 116) and the SMC 124 can proceed to have the tenant review and evaluate the current subgroups of resources associated with the current SGs, the current modified group of security rules, the cluster-related information relating to the various clusters that were determined by the cluster component 214, the test result information, and/or the performance metrics (e.g., allowance quality metric, denial quality metric) associated with the current modified group of security rules. Based at least in part on the review and evaluation by the tenant, the tenant can adapt (e.g., change or modify) the sizes or makeup of clusters (e.g., subgroups) of resources and/or clusters of network addresses and port addresses, assignment of resources to clusters, and/or other features relating to clustering, such as more fully described herein, to facilitate adapting the security rules to enhance (e.g., improve, increase, optimize, and/or make more accurate) the performance of the security rules with regard to management of data traffic associated with the resources associated with the application and satisfy the defined security management criteria and the tenant. In some embodiments, the SMC 124 can analyze the current subgroups of resources associated with the current SGs, the current modified group of security rules, the cluster-related information relating to the various clusters that were determined by the cluster component 214, the test result information, and/or the performance metrics associated with the current modified group of security rules, and, based at least in part on the results of such analysis, the SMC 124 can determine adaptations that can be made to the sizes or makeup of clusters (e.g., subgroups) of resources and/or clusters of network addresses and port addresses, assignment of resources to clusters, and/or other features relating to clustering to facilitate adapting the security rules to enhance the performance of the security rules with regard to management of data traffic associated with the resources associated with the application and satisfy the defined security management criteria and the tenant. The SMC 124 can present (e.g., communicate or display), via the interface component 218, recommendations for adaptations relating to such clustering to the tenant (e.g., to an interface or communication device associated with the tenant) for consideration by the tenant, and, if desired, the tenant can make adaptations relating to the clustering based at least in part on the adaptation recommendations.

With the cluster-related adaptations made by the tenant, the SMC 124, employing the security rule component 202, can proceed to determine and generate an adapted group of security rules (e.g., a new and adapted modified group of security rules), comprising adapted subgroups of security rules associated with respective adapted SGs associated with respective adapted subgroups of resources (e.g., 106, 108, and/or 110; and/or 408, 410, 412, 414, . . . , 422, 424, and/or 426) associated with the application associated with the tenant (e.g., 112, 114, or 116), using the techniques, such as more fully described herein. The SMC 124 can test the adapted group of security rules, determine performance metrics relating to performance of the adapted group of security rules, and can determine whether the adapted group of security rules satisfy the defined security management criteria and/or the tenant, using the techniques, such as more fully described herein. The SMC 124 can continue this disclosed iterative process (e.g., for one or more iterations) for determining a desirable group of security rules, comprising respective subgroups of security rules associated with respective SGs, to apply to the respective SGs associated with respective subgroups of resources associated with the application associated with the tenant until the defined security management criteria and tenant are satisfied that the security rules are desirable (e.g., suitable or optimal).

As desired, periodically, upon request by the tenant (e.g., 112, 114, or 116), or dynamically (e.g., in response to changes to the resources or application associated with the tenant, or in response to a malicious attack on the resources, application, cloud network 104, or communication network 102), the SMC 124 can perform the security rules determination flow 300 to facilitate determining whether it is desirable to make adaptations to security rules, SGs, subgroupings of resources, or other features associated with the application associated with the tenant, in accordance with the defined security management criteria.

Figure 7:
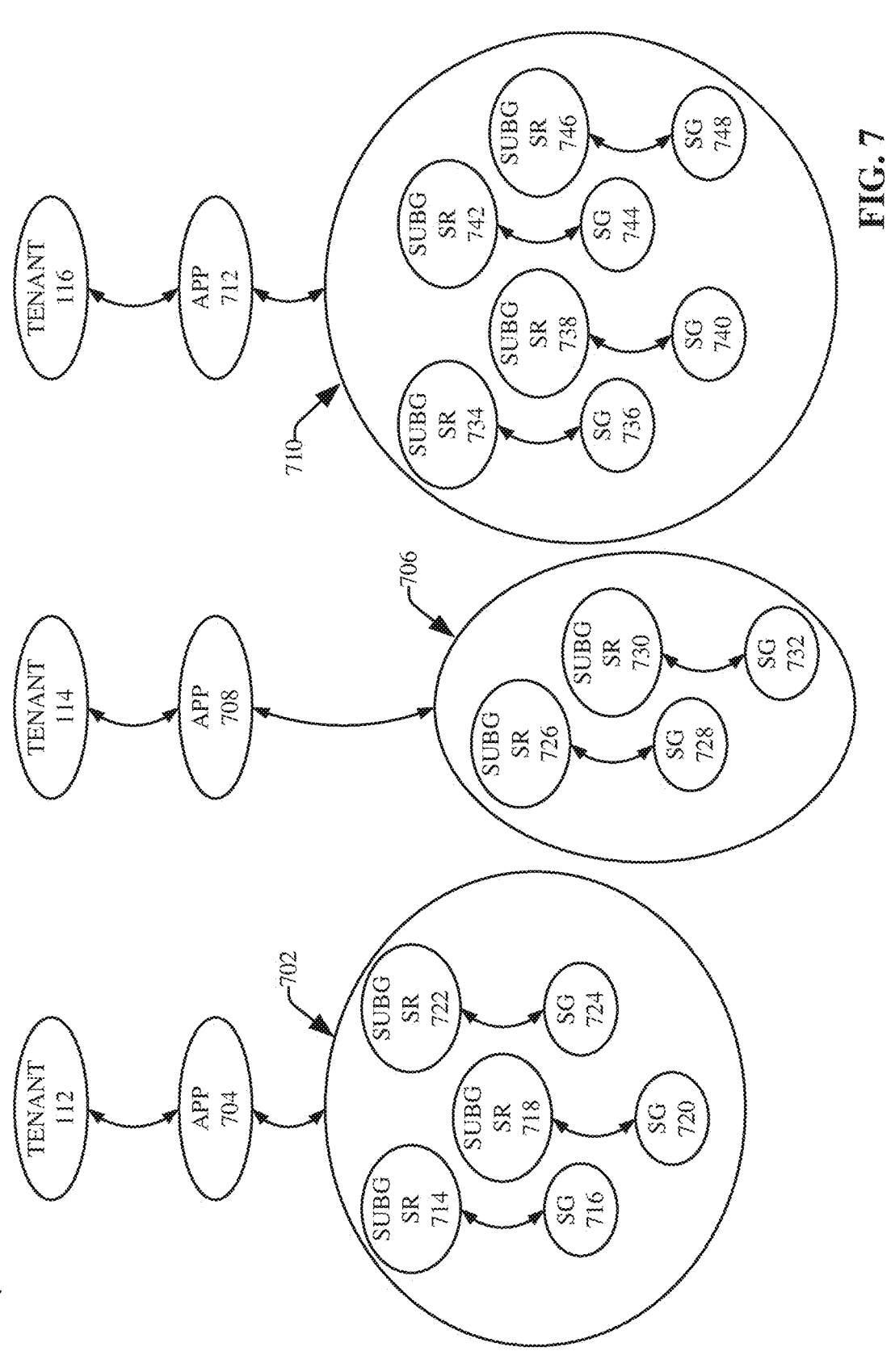
FIG. 7 illustrates a block diagram of example groups of security rules associated with respective applications associated with respective tenants, in accordance with various aspects and embodiments of the disclosed subject matter.

Referring to FIG. 7 (along with FIGS. 1-6), FIG. 7 illustrates a block diagram of example groups of security rules 700 associated with respective applications associated with respective tenants, in accordance with various aspects and embodiments of the disclosed subject matter. Employing the techniques and algorithms described herein, the SMC 124 can determine and generate respective groups of security rules associated with respective applications associated with respective tenants that utilize the cloud network 104 and applications and services associated therewith. The groups of security rules can comprise, for example, a group of security rules 702 associated with application (APP) 704 associated with tenant 112, a group of security rules 706 associated with application 708 associated with tenant 114, and/or a group of security rules 710 associated with application 712 associated with tenant 116. Different applications can be respectively associated with different numbers of SGs and different numbers of subgroups of security rules associated therewith.

In some embodiments, the group of security rules 702 associated with the application 704 associated with the tenant 112 can comprise respective subgroups of security rules (SUBG SR) associated with respective SGs, such as, for example, subgroup of security rules 714 associated with SG 716, subgroup of security rules 718 associated with SG 720, and/or subgroup of security rules 722 associated with SG 724, that can be associated with respective subgroups of resources associated with the application 704. The group of security rules 706 associated with the application 708 associated with the tenant 114 can comprise respective subgroups of security rules associated with respective SGs, such as, for example, subgroup of security rules 726 associated with SG 728 and/or subgroup of security rules 730 associated with SG 732, that can be associated with respective subgroups of resources associated with the application 708. The group of security rules 710 associated with the application 712 associated with the tenant 116 also can comprise respective subgroups of security rules associated with respective SGs, such as, for example, subgroup of security rules 734 associated with SG 736, subgroup of security rules 738 associated with SG 740, subgroup of security rules 742 associated with SG 744, and/or subgroup of security rules 746 associated with SG 748, that can be associated with respective subgroups of resources associated with the application 712.

With further regard to FIG. 2, the communicator component 222 can transmit information to other components or devices (e.g., cloud network components, devices, or equipment, communication network components, devices, or equipment, communication devices) and can receive information from other components or devices. For example, the communicator component 222 can transmit messages, signals, and/or data relating to applications associated with tenants, resources, SGs, security rules, clusters related to resources, performance metrics, test results, and/or other desired information. As another example, the communicator component 222 also can receive messages, signals, and/or data relating to feedback relating to clusters, SGs, or security rules from tenants, selection or adaptation of clusters or security rules from tenants, data network traffic, information relating to network data traffic, and/or other desired information.

The operations manager component 224 can control (e.g., manage) operations associated with the SMC 124. For example, the operations manager component 224 can facilitate generating instructions to have components of the SMC 124 perform operations, and can communicate respective instructions to respective components (e.g., security rule component 202, rule enforcement component 204, a monitor component 206, filter component 208, AI component 210, model component 212, cluster component 214, SG component 216, interface component 218, metrics component 220, communicator component 222, processor component 226, and data store 228) of the SMC 124 to facilitate performance of operations by the respective components of the SMC 124 based at least in part on the instructions, in accordance with the defined security management criteria and security management algorithms (e.g., security rules determination algorithms, AI or machine learning algorithms, clustering algorithms, data filtering algorithms, metrics determination algorithms, or other algorithms, as disclosed, defined, recited, or indicated herein by the methods, systems, and techniques described herein). The operations manager component 224 also can facilitate controlling data flow between the respective components of the SMC 124 and controlling data flow between the SMC 124 and another component(s) or device(s) (e.g., a communication device, a base station or other network component or device of the communication network, cloud network equipment, cloud equipment resources, data sources, applications, or other type of component or device) associated with (e.g., connected to) the SMC 124.

The processor component 226 can work in conjunction with the other components (e.g., security rule component 202, rule enforcement component 204, a monitor component 206, filter component 208, AI component 210, model component 212, cluster component 214, SG component 216, interface component 218, metrics component 220, communicator component 222, operations manager component 224, and data store 228) to facilitate performing the various functions of the SMC 124. The processor component 226 can employ one or more processors, microprocessors, or controllers that can process data, such as information relating to applications, resources, security rules, SGs, network data traffic, clustering relating to resources, performance metrics associated with security rules, authentication credentials associated with communication devices or users (e.g., tenants), metadata, messages, parameters, threshold values, traffic flows, policies, defined network security criteria, algorithms (e.g., security rules determination algorithms, AI or machine learning algorithms, clustering algorithms, data filtering algorithms, metrics determination algorithms, or other algorithms, as disclosed, defined, recited, or indicated herein by the methods, systems, and techniques described herein), protocols, interfaces, tools, and/or other information, to facilitate operation of the SMC 124, as more fully disclosed herein, and control data flow between the SMC 124 and other components (e.g., a communication device, a base station or other network component or device of the communication network, cloud network equipment, cloud equipment resources, data sources, applications, or other type of component or device) associated with the SMC 124.

The data store 228 can store data structures (e.g., user data, metadata), code structure(s) (e.g., modules, objects, hashes, classes, procedures) or instructions, information relating to applications, resources, security rules, SGs, network data traffic, clustering relating to resources, performance metrics associated with security rules, authentication credentials associated with communication devices or users (e.g., tenants), metadata, messages, parameters, threshold values, traffic flows, policies, defined network security criteria, algorithms (e.g., security rules determination algorithms, AI or machine learning algorithms, clustering algorithms, data filtering algorithms, metrics determination algorithms, or other algorithms, as disclosed, defined, recited, or indicated herein by the methods, systems, and techniques described herein), protocols, interfaces, tools, and/or other information, to facilitate controlling operations associated with the SMC 124. In an aspect, the processor component 226 can be functionally coupled (e.g., through a memory bus) to the data store 228 in order to store and retrieve information desired to operate and/or confer functionality, at least in part, to the security rule component 202, rule enforcement component 204, a monitor component 206, filter component 208, AI component 210, model component 212, cluster component 214, SG component 216, interface component 218, metrics component 220, communicator component 222, operations manager component 224, processor component 226, and data store 228, or other component, and/or substantially any other operational aspects of the SMC 124.

With further regard to the AI component 210, the AI component 210 can perform an AI and/or ML analysis on data, such as network data traffic, information relating to network data traffic, and/or other desired data, such as more fully described herein. In connection with or as part of such an AI or ML analysis, the AI component 210 can employ, build (e.g., construct or create), and/or import, AI and/or ML techniques and algorithms, AI and/or ML models (e.g., trained models), neural networks (e.g., trained neural networks), and/or graph mining to render and/or generate predictions, inferences, calculations, prognostications, estimates, derivations, forecasts, detections, and/or computations that can facilitate determining clusters relating to resources, determining clusters relating to network addresses and port addresses associated with ports of resources, determining or modifying security rules associated with SGs, and/or automating one or more functions or features of the disclosed subject matter, as more fully described herein.

The AI component 210 can employ various AI-based or machine learning (ML)-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 210 can examine the entirety or a subset of the data (e.g., data in or associated with network data traffic, data relating to security rules, data relating to applications, or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The systems and/or devices, including the aforementioned systems and/or devices, described herein have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
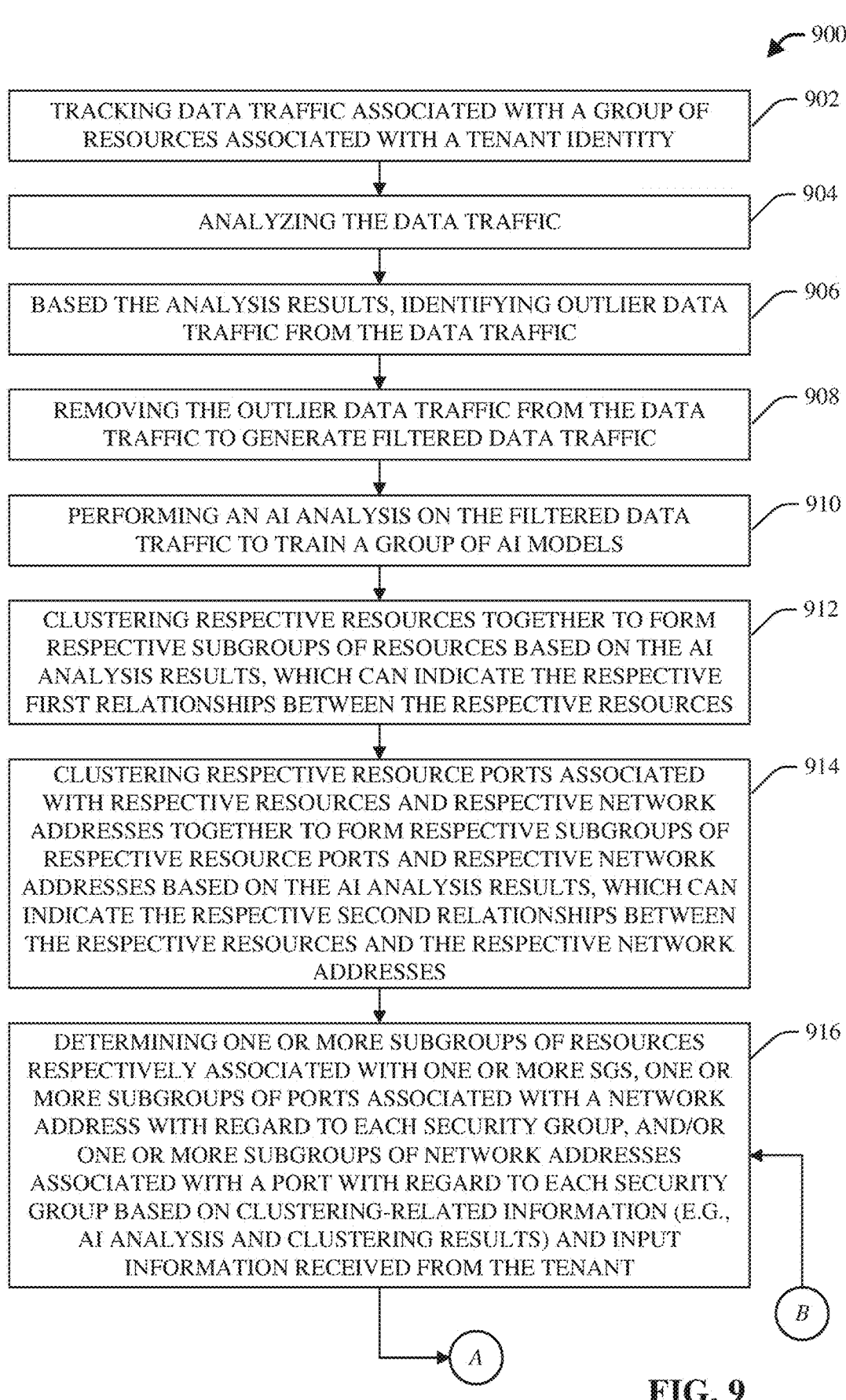

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 that can desirably learn and/or determine security rules to apply to resources, including VMs, in a cloud network and on network edges, in accordance with various aspects and embodiments of the disclosed subject matter. The method 800 can be employed by, for example, a system comprising the SMC, a processor component (e.g., of or associated with the SMC), and/or a data store (e.g., of or associated with the SMC).

At 802, information relating to respective items of data traffic associated with a group of resources associated with a tenant identity can be analyzed, wherein the group of resources can be associated with cloud network equipment of a cloud network, and wherein ingress and egress of the respective items of data traffic to and from respective resources of the group of resources can be controlled based at least in part on a group of security rules associated with the tenant identity. The SMC can analyze the information relating to the respective items of data traffic associated with the group of resources (e.g., VMs or other resources) associated with the tenant identity. The tenant identity can be one tenant identity of a group of tenant identities that can access, utilize, and/or share the group of resources. In some embodiments, input information relating to selection of the group of security rules can be received from a communication device associated with the tenant identity, and the group of security rules can be applied to, and/or enforced with regard to, the group of resources and the items of data traffic. For instance, the SMC can apply the group of security rules (e.g., for a desired amount of time) to the respective items of data traffic and the group of resources, and can control the ingress and egress of the respective items of data traffic to and from respective resources of the group of resources based at least in part on the group of security rules associated with the tenant identity.

At 804, based at least in part on a result of the analyzing of the information relating to the respective items of data traffic, a modified group of security rules, which can be applied to the group of resources associated with the tenant identity, can be determined, to facilitate controlling ingress and egress of subsequent items of data traffic to and from the respective resources based at least in part on the modified group of security rules, wherein the result of the analyzing can indicate respective first relationships determined between the respective resources and respective second relationships determined between the respective resources and respective network addresses associated with the cloud network and communication network. The SMC can determine the modified group of security rules to be applied to the group of resources associated with the tenant identity based at least in part on the result of the analyzing of the information relating to the respective items of data traffic. The analysis result can indicate the respective first relationships determined (e.g., by the SMC) between the respective resources (e.g., the respective frequencies of communications or interactions between respective pairs of resources) and respective second relationships determined (e.g., by the SMC) between the respective resources (e.g., respective ports of respective resources) and the respective network addresses (e.g., IP addresses) associated with the cloud network and communication network, such as more fully described herein. The SMC can determine the modified group of security rules to be applied to the group of resources associated with the tenant identity based at least in part on the respective first relationships between the respective resources and/or the respective second relationships between the respective resources and the respective network addresses associated with the cloud network, such as more fully described herein.

In some embodiments, the SMC can make an initial determination of the modified group of security rules, and, based at least in part on input information (e.g., selection information of the tenant) received from the communication device associated with the tenant identity and/or testing results from the testing of the initial modified group of security rules, the SMC can adapt or alter the modified group of security rules to enhance such rules even more, such as more fully described herein. The SMC can apply or facilitate applying the modified group of security rules (e.g., as adapted or altered) to subsequent data traffic associated with the group of resources associated with the tenant identity.

FIGS. 9 and 10 depict a flow chart of an example method 900 that can desirably learn, determine, and test security rules to apply to resources, including VMs, in a cloud network and on network edges, in accordance with various aspects and embodiments of the disclosed subject matter. The method 900 can be employed by, for example, a system comprising the SMC, a processor component (e.g., of or associated with the SMC), and/or a data store (e.g., of or associated with the SMC).

At 902, data traffic associated with a group of resources associated with a tenant identity can be tracked. The SMC can monitor, track, and/or collect the data traffic (e.g., network data traffic), and information relating thereto, associated with the group of resources (e.g., VMs or other resources) associated with an application associated with the tenant identity (e.g., associated with a tenant associated with or having the tenant identity) for a desired period of time (e.g., a week, a month, or other desired amount of time). The data traffic can comprise data traffic between respective resources of the group of resources and/or data traffic between respective resources and the communication network (e.g., between respective resources and communication devices associated with the communication network). During this time of tracking, the flow of the data traffic, including the ingress or egress of data traffic to or from resources of the groups of resources, can be managed based at least in part on a group of security rules initially selected by the tenant (or, in the case of a subsequent security rules analysis and determination by the SMC, a group of security rules that was previously determined by the SMC and was based on feedback information received from or adaptation made by the tenant).

At 904, the data traffic can be analyzed. The SMC can analyze the data traffic, and information relating thereto, to determine or facilitate determining the types of data traffic (e.g., communication of data, IP scanning, port scanning, or other type of data traffic), the source and destination of data traffic (e.g., the sender of data traffic, the recipient of data traffic), and/or other desired characteristics (e.g., packet size, packet interval, session, duration, protocol, network address, port address, and/or other type of characteristic) associated with the data traffic.

At 906, based at least in part on the results of the analysis, outlier data traffic can be identified from the data traffic. At 908, the outlier data traffic can be removed from the data traffic to generate filtered data traffic. The SMC can identify or determine one or more items of outlier data traffic from the data traffic based at least in part on the analysis results. The one or more items of outlier data traffic can comprise, for example, data items relating to port scanning, IP scanning, and/or other type of data traffic that can be considered to be outlier data traffic, in accordance with the defined security management criteria (e.g., security management criteria relating to filtering of outlier data traffic). The SMC can remove (e.g., filter out) the one or more items of outlier data traffic from the data traffic to generate the filtered data traffic, which can comprise one or more items of data traffic that remain in the data traffic after the removal of the one or more items of outlier data traffic from the data traffic.

At 910, an AI analysis can be performed on the filtered data traffic to train a group of AI models. The SMC, employing the AI component, can perform an AI analysis (e.g., AI, ML, and/or neural network analysis) on the filtered data traffic, comprising inputting the filtered data traffic associated with the tenant identity to the group of AI models, comprising one or more AI models, to train the group of AI models to facilitate determining relationships associated with the filtered data traffic. For instance, the results of the AI analysis and/or the training of the group of AI models by the AI component can indicate respective first relationships between (e.g., determined or inferred between) the respective resources (e.g., between respective VMs) and respective second relationships between (e.g., determined or inferred between) the respective resources and respective network addresses associated with the cloud network and communication network.

At 912, respective resources can be clustered together to form respective subgroups of resources of the group of resources based at least in part on the AI analysis results, which can indicate the respective first relationships between the respective resources. For instance, the SMC, employing the AI component and associated AI model(s), can determine respective clusters of the respective resources of the group of resources, based at least in part on the respective first relationships between the respective resources to form the respective subgroups of resources, in accordance with the defined security management criteria. For example, if the SMC, employing the AI component and associated AI model(s), determines that a first resource and a second resource interact or communicate with each other a number of times over the desired period of time that is sufficient to satisfy a defined threshold frequency of (e.g., a minimum threshold number of) resource interactions or communications, the SMC can determine that the first resource and the second resource are to be clustered together into a subgroup of resources, such as described herein.

At 914, respective resource ports associated with respective resources and respective network addresses can be clustered together to form respective subgroups of respective resource ports and respective network addresses based at least in part on the AI analysis results, which can indicate the respective second relationships between the respective resources and the respective network addresses. For instance, the SMC, employing the AI component and associated AI model(s), can determine respective clusters of the respective resource ports (e.g., resource port addresses associated with respective resource ports) and the respective network addresses, based at least in part on the respective second relationships between the respective resources and the respective network addresses to form the respective subgroups of respective resource ports (e.g., resource port addresses) and respective network addresses, in accordance with the defined security management criteria. In some embodiments, the respective second relationships can be determined or inferred (e.g., by the SMC) based at least in part on respective characteristics (e.g., packet size, packet interval, session duration, protocol, network address, port address, frequency of communications or interactions, or other desired characteristic) associated with the respective data sessions, as more fully described herein.

At 916, one or more subgroups (e.g., clusters) of resources respectively associated with one or more SGs, one or more subgroups (e.g., clusters) of ports associated with a network address with regard to each security group, and/or one or more subgroups (e.g., clusters) of network addresses associated with a port with regard to each security group can be determined based at least in part on clustering-related information (e.g., AI analysis and clustering results) and input information (e.g., selection or feedback information) received from the tenant. For instance, the SMC can present, via an interface component and/or a communication device (e.g., a display screen of the communication device), the information (e.g., AI analysis and clustering results) relating to the clustering of resources, clustering of ports (e.g., port addresses associated with ports) associated with a network address, and/or clustering of network addresses associated with a port (e.g., port address associated with the port) to the tenant. The tenant can review and evaluate such information and can provide input information, via the interface component and/or communication device, to the SMC, to facilitate selecting desired clustering of resources (e.g., selecting one or more clusters of resources (e.g., VMs)), selecting desired clustering (e.g., one or more clusters) of ports associated with a network address, and/or selecting desired clustering (e.g., one or more clusters) of network addresses associated with a port.

For example, if the tenant is satisfied with the clustering that was performing by the SMC (e.g., employing the AI component and associated AI model(s)), the input information from the tenant can indicate that the clustering that was performed by the SMC is accepted and no changes to the clustering are to be made. If, instead, the tenant evaluates the clustering that was performing by the SMC and decides that it would be better for the clustering of resources to be changed (e.g., merge two clusters of resources together to form one cluster of resources; divide a cluster of resources into two clusters of resources; with regard to a resource that is part of two clusters of resource, remove the resource from one of the clusters; or other type of cluster change), the input information from the tenant can indicate that the desired change(s) to the clustering of the resources.

Additionally and/or alternatively, if the tenant evaluates the clustering that was performing by the SMC and decides that it would be better for the respective clustering of ports associated with network addresses to be changed (e.g., merge a first cluster of first ports associated with a network address with a second cluster of second ports associated with the network address to form a cluster of the first and second ports associated with the network address; divide a cluster of ports associated with a network address into two clusters comprising respective portions of the ports; or other type of cluster change), the input information from the tenant can indicate that the desired change(s) to the respective clustering of the ports associated with network addresses.

Additionally and/or alternatively, if the tenant evaluates the clustering that was performing by the SMC and decides that it would be better for the respective clustering of network addresses associated with ports to be changed (e.g., merge a first cluster of first network addresses associated with a port with a second cluster of second network addresses associated with the port to form a cluster of the first and second network addresses associated with the port; divide a cluster of network addresses associated with a port into two clusters comprising respective portions of the network addresses; or other type of cluster change), the input information from the tenant can indicate that the desired change(s) to the respective clustering of the network addresses associated with ports.

The SMC can determine the one or more subgroups (e.g., clusters) of resources respectively associated with one or more SGs, the one or more subgroups (e.g., clusters) of ports associated with a network address with regard to each security group, and/or the one or more subgroups (e.g., clusters) of network addresses associated with a port with regard to each security group based at least in part on the clustering-related information (e.g., AI analysis and clustering results) relating to the clustering of resources, clustering of ports associated with a network address, and/or clustering of network addresses associated with a port, and the input information (e.g., selection or feedback information) received from the tenant.

At this point, the method 900 can proceed to reference point A, where, in FIG. 10, the method 900 can proceed from reference point A to reference numeral 918 and can further proceed from there.

At 918, respective subgroups of security rules associated with the respective SGs and associated respective subgroups of resources can be determined based at least in part on the determined one or more subgroups of resources respectively associated with one or more SGs, the determined one or more subgroups of ports associated with a network address with regard to each SG, and/or the determined one or more subgroups of network addresses associated with a port with regard to each SG. The SMC can synthesize, summarize, transform, and/or translate the patterns relating to the determined (e.g., determined and/or selected) one or more subgroups of resources respectively associated with one or more SGs, the determined one or more subgroups of ports associated with a network address with regard to each SG, and/or the determined one or more subgroups of network addresses associated with a port with regard to each SG. Based at least in part on such synthesizing, summarizing, transforming, and/or translating of the patterns, the SMC can determine the respective subgroups of security rules associated with the respective SGs and the associated respective subgroups of resources.

At 920, the respective subgroups of security rules associated with the respective SGs and the associated respective subgroups of resources can be tested, based at least in part on an application of a portion of the data traffic, as testing data traffic, to the respective subgroups of resources, to generate test results that can indicate whether the respective subgroups of security rules are desirable (e.g., suitable, acceptable, or optimal). The SMC can generate or allocate the portion of the data traffic for use as testing data traffic. The SMC can apply the testing data traffic to the respective subgroups of resources, in connection with the application of the respective subgroups of security rules associated with the respective SGs to the testing data traffic being applied to the respective subgroups of resources. The SMC can determine or generate the test results based at least in part on the application of the testing data traffic to the respective subgroups of resources and the associated respective subgroups of security rules associated with the respective SGs.

At 922, based at least in part on the test results and/or input information associated with the tenant, a determination can be made regarding whether the respective subgroups of security rules satisfy the defined security management criteria. The SMC can determine whether the respective subgroups of security rules associated with the respective SGs and the respective subgroups of resources satisfy (e.g., meet or exceed) the defined security management criteria, based at least in part on the test results and/or input information received from the tenant (e.g., via an interface component or communication device), wherein the input information can indicate whether or not the tenant determines that the respective subgroups of security rules satisfy the defined security management criteria.

If it is determined that the respective subgroups of security rules satisfy the defined security management criteria, at 924, the respective subgroups of security rules associated with the respective SGs and the respective subgroups of resources can be applied to subsequent data traffic associated with the respective subgroups of resources. If the SMC determines that the respective subgroups of security rules satisfy the defined security management criteria, the SMC can apply the respective subgroups of security rules associated with the respective SGs to subsequent data traffic associated with the respective subgroups of resources.

Referring again to reference numeral 922, if, instead, at 922, it is determined that one or more of the respective subgroups of security rules do not satisfy the defined security management criteria, at 926, a determination can be made that one or more of the respective subgroups of security rules associated with the respective SGs and the respective subgroups of resources are to be adapted to facilitate satisfying the defined security management criteria. At this point, the method 900 can proceed to reference point B of FIGS. 9 and 10, where, in FIG. 9, the method 900 can proceed from reference point B to return the method 900 to reference numeral 916, wherein one or more subgroups (e.g., clusters) of resources respectively associated with one or more SGs, one or more subgroups (e.g., clusters) of ports associated with a network address with regard to each security group, and/or one or more subgroups (e.g., clusters) of network addresses associated with a port with regard to each security group can be adapted and/or determined based at least in part on the clustering-related information (e.g., AI analysis and clustering results) and input information (e.g., additional input or selection information) received from the tenant, and the method 900 can proceed from that point (e.g., until desired respective subgroups of resources and desired respective subgroups of security rules associated with desired respective SGs that satisfy the defined security management criteria are determined by the SMC and/or tenant).

Figure 11:
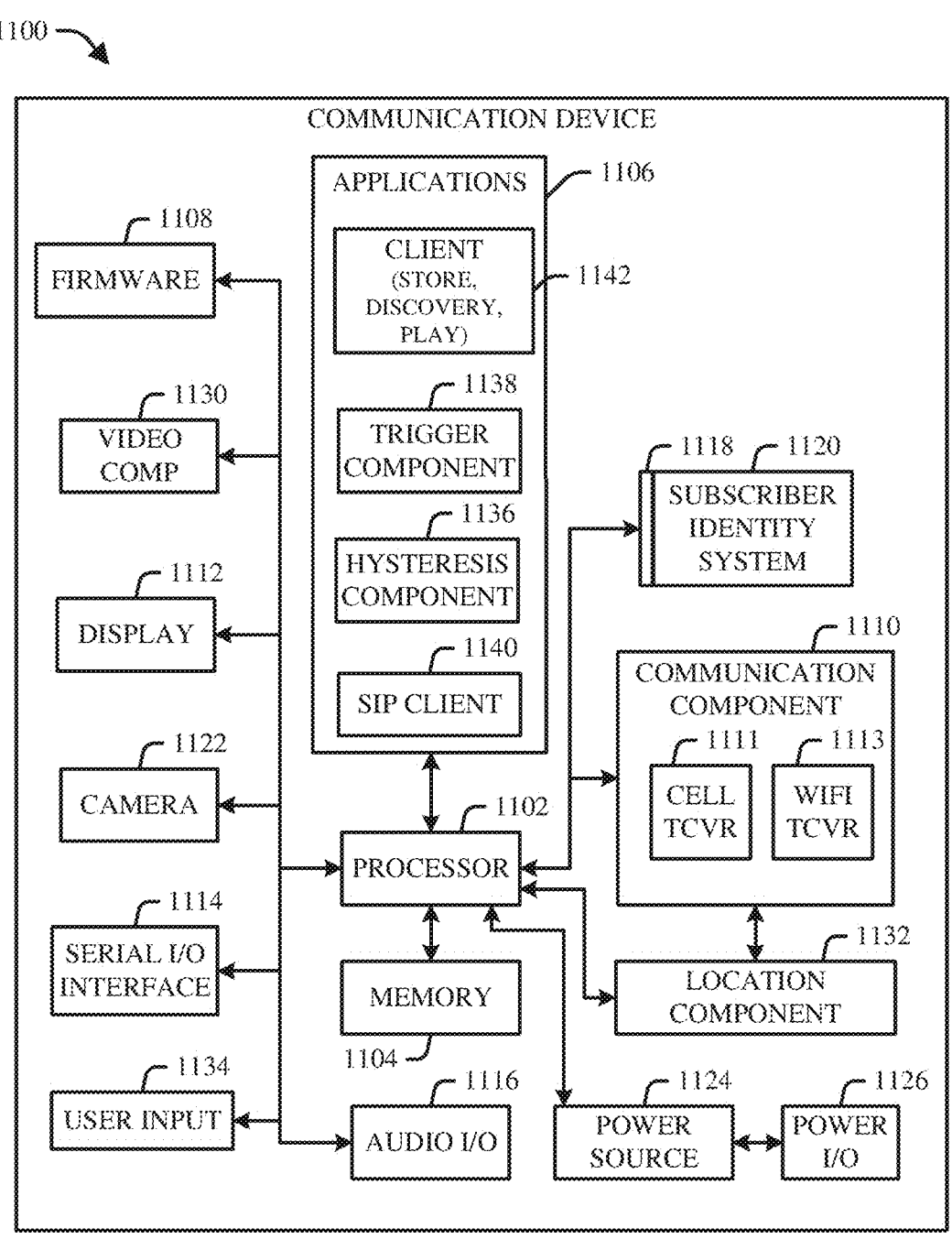
FIG. 11 depicts a block diagram of example communication device, in accordance with various aspects and embodiments of the disclosed subject matter.

Referring now to FIG. 11, depicted is an example block diagram of an example communication device 1100 (e.g., wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 1100 can include a processor 1102 for controlling and processing all onboard operations and functions. A memory 1104 interfaces to the processor 1102 for storage of data and one or more applications 1106 (e.g., a video player software, user feedback component software, or other type of application). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the communication device 1100. A communication component 1110 interfaces to the processor 1102 to facilitate wired/wireless communication with external systems, e.g., cellular networks, VoIP networks, and so on. Here, the communication component 1110 can also include a suitable cellular transceiver 1111 (e.g., a GSM transceiver) and/or an unlicensed transceiver 1113 (e.g., Wi-Fi, WiMax) for corresponding signal communications. The communication device 1100 can be a device such as a cellular telephone, a PDA with mobile communications capabilities, and messaging-centric devices. The communication component 1110 also facilitates communications reception from terrestrial radio networks (e.g., broadcast), digital satellite radio networks, and Internet-based radio services networks.

The communication device 1100 includes a display 1112 for displaying text, images, video, telephony functions (e.g., a Caller ID function), setup functions, and for user input. For example, the display 1112 can also be referred to as a "screen" that can accommodate the presentation of multi-media content (e.g., music metadata, messages, wallpaper, graphics, or other content). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The communication device 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the communication device 1100, and updated by downloading data and software.

The communication device 1100 can process IP data traffic through the communication component 1110 to accommodate IP traffic from an IP network such as, for example, the Internet, a corporate intranet, a home network, a person area network, or other network, through an ISP or broadband cable provider. Thus, VoIP traffic can be utilized by the communication device 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The communication device 1100 also includes a power source 1124 in the form of batteries and/or an AC power subsystem, which power source 1124 can interface to an external power system or charging equipment (not shown) by a power I/O component 1126.

The communication device 1100 can also include a video component 1130 for processing video content received and, for recording and transmitting video content. For example, the video component 1130 can facilitate the generation, editing and sharing of video quotes. A location tracking component 1132 facilitates geographically locating the communication device 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the communication device 1100 to support SIP protocols and register the subscriber with the SIP registrar server. The applications 1106 can also include a client 1142 that provides at least the capability of discovery, play and store of multimedia content, for example, music.

The communication device 1100, as indicated above related to the communication component 1110, includes an indoor network radio transceiver 1113 (e.g., Wi-Fi transceiver). This function supports the indoor radio link, such as IEEE 802.11, for the dual-mode GSM device (e.g., communication device 1100). The communication device 1100 can accommodate at least satellite radio services through a device (e.g., handset device) that can combine wireless voice and digital radio chipsets into a single device (e.g., single handheld device).

Figure 12:
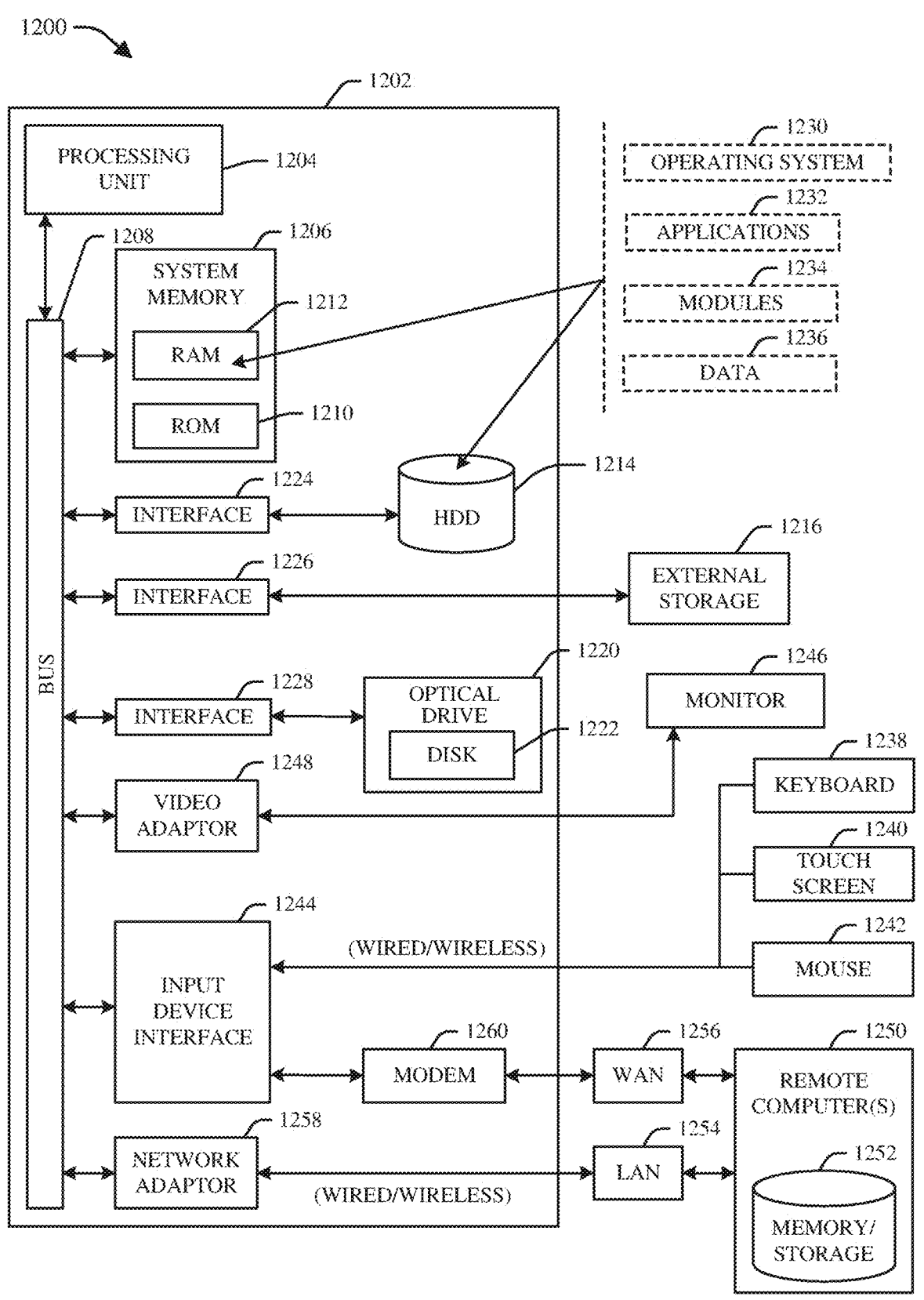
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, or other type of storage device) and an optical disk drive 1220 (e.g., which can read or write from a CD-ROM disc, a DVD, a BD, or other disk drive). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH™ interface, or other type of interface.

A monitor 1246 or other type of display device can be also connected to the system bus 1208 via an interface, such as a video adapter 1248. In addition to the monitor 1246, a computer typically includes other peripheral output devices (not shown), such as speakers, printers, or other type of peripheral output device.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11

(a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well as non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or non-volatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication network, cloud network, communication device, security management component, resources, VMs, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
based on a result of an analyzing of information relating to respective items of data traffic associated with a group of resources associated with a tenant identity, determining, by a system comprising a processor, a modified group of security rules to apply to the group of resources, wherein the group of resources is associated with cloud network equipment of a cloud network, wherein ingress and egress of the respective items of data traffic to and from respective resources of the group of resources had been controlled prior to the determining of the modified group of security rules based on a prior group of security rules associated with the tenant identity, wherein the determining facilitates controlling ingress and egress of subsequent items of data traffic to and from the respective resources based on the modified group of security rules, and wherein the result of the analyzing indicates respective first relationships determined between the respective resources and respective second relationships determined between the respective resources and respective network addresses associated with the cloud network;
clustering, by the system, a first portion of the respective resources to form a first subgroup of resources and a second portion of the respective resources to form a second subgroup of resources, based on respective first communications determined between the respective resources and a defined communication frequency criterion, wherein a first resource and a second resource of the respective resources are clustered together in the first subgroup of resources based on a determination that a frequency of communications between the first resource and the second resource satisfy the defined communication frequency criterion, wherein respective security groups are associated with respective groups of security rules, and wherein the respective security groups comprise a first security group and a second security group; and
associating, by the system, the first subgroup of resources with the first security group and the second subgroup of resources with the second security group.

2. The method of claim 1, wherein at least a portion of the respective resources of the group of resources are shared amongst tenant identities comprising the tenant identity.

3. The method of claim 1, wherein the first security group is associated with the modified group of security rules, and wherein at least one of: the first security group governs the first resource, the first security group governs the first resource and the second resource, or the first security group and the second security group govern the first resource.

4. The method of claim 1, wherein the result is a first result, and wherein the method further comprises:
based on a second result of the analyzing, identifying, by the system, outlier items of data of the respective items of data traffic, wherein the outlier items of data comprise items of network scanning data or items of port scanning data; and
filtering, by the system, the respective items of data traffic to remove the outlier items of data from the respective items of data traffic.

5. The method of claim 1, further comprising performing the analyzing, wherein the analyzing comprises performing an artificial intelligence analysis process on the respective items of data traffic, in accordance with an artificial intelligence algorithm, wherein the performing of the artificial intelligence analysis process on the respective items of data traffic comprises inputting the respective items of data traffic to an artificial intelligence model, and wherein the method further comprises:
training, by the system, the artificial intelligence model based on the artificial intelligence analysis process and the respective items of data traffic input to the artificial intelligence model; and
learning or inferring, by the system, a modified security rule of the modified group of security rules based on the artificial intelligence model.

6. The method of claim 1, further comprising:
based on the result of the analyzing:
determining, by the system, the respective first communications between the respective resources;
determining, by the system, respective second communications between the respective resources and network equipment of a communication network; and determining, by the system, interactions between respective network addresses and respective ports associated with the respective resources.

7. The method of claim 6, further comprising:

with regard to the first subgroup of resources associated with the first security group:

clustering, by the system, a third portion of the respective network addresses associated with a port of the respective ports to form a group of network addresses associated with the port; or clustering, by the system, a fourth portion of the respective ports associated with a network address of the respective network addresses to form a group of ports associated with the network address.

8. The method of claim 7, further comprising:

presenting, by the system, to a device associated with the tenant identity, clustering-related information relating to at least one of respective clustering of respective portions of the respective resources to form respective subgroups of the respective resources, the group of network addresses associated with the port with regard to the first subgroup of resources associated with the first security group, or the group of ports associated with the network address with regard to the first subgroup of resources associated with the first security group, wherein the respective subgroups of the respective resources comprise the first subgroup of resources and the second subgroup of resources; and receiving, by the system, input information from the device, wherein the input information indicates whether the first subgroup of resources or the second subgroup of resources is to be modified, whether the group of network addresses associated with the port is to be modified, or whether the group of ports associated with the network address is to be modified.

9. The method of claim 8, wherein the modified group of security rules comprises respective modified subgroups of security rules associated with the respective subgroups of the respective resources, and wherein the method further comprises:

based on the clustering-related information or the input information:

determining, by the system, the respective subgroups of the respective resources; and determining, by the system, the respective modified subgroups of security rules associated with the respective subgroups of the respective resources.

10. The method of claim 1, wherein the group of resources comprises respective subgroups of the respective resources, wherein the modified group of security rules comprises respective modified subgroups of security rules associated with the respective subgroups of the respective resources, and wherein the method further comprises:

allocating, by the system, a portion of the respective items of data traffic as testing data traffic;

applying, by the system, the testing data traffic and the respective modified subgroups of security rules to the respective subgroups of the respective resources; and determining, by the system, respective performance metrics of the respective modified subgroups of security rules based on the applying of the testing data traffic and the respective modified subgroups of security rules to the respective subgroups of the respective resources.

11. The method of claim 10, further comprising:

evaluating, by the system, the respective performance metrics of the respective modified subgroups of security rules associated with the respective subgroups of the respective resources;

determining, by the system, whether the respective performance metrics satisfy a defined performance metric criterion relating to accuracy of data traffic management of the respective modified subgroups of security rules; and with regard to a performance metric of the respective performance metrics of a modified group of security rules of the respective modified subgroups of security rules associated with a subgroup of the respective resources of the respective subgroups of the respective resources:

in response to determining that the performance metric satisfies the defined performance metric criterion, applying, by the system, the modified subgroup of security rules associated with the subgroup of the respective resources to the subsequent items of data traffic, or in response to determining that the performance metric does not satisfy the defined performance metric criterion, determining, by the system, that the modified subgroup of security rules is to be adapted.

12. The method of claim 1, wherein the group of resources comprises virtual machines.

13. A system, comprising:

a processor; and a memory that stores executable instructions that, when executed by the processor, facilitate performance of operations, the operations comprising:

based on a result of an analyzing of respective items of data traffic associated with a group of resources associated with a tenant identity, determining an adapted group of security rules to apply to the group of resources, wherein the group of resources are associated with a cloud network device associated with a cloud network environment, wherein ingress and egress of the respective items of data traffic to and from respective resources of the group of resources had been managed prior to the determining of the adapted group of security rules based on a prior group of security rules associated with the tenant identity, wherein the determining facilitates managing ingress and egress of subsequent items of data traffic to and from the respective resources based on the adapted group of security rules, and wherein the result of the analyzing indicates respective first relationships determined between the respective resources and respective second relationships determined between the respective resources and respective network addresses associated with the cloud network environment;

clustering a first portion of the respective resources to form a first subgroup of resources and a second portion of the respective resources to form a second subgroup of resources, based on respective first communications determined between the respective resources and a defined communication frequency criterion, wherein a first resource and a second resource of the respective resources are clustered together in the first subgroup of resources based on a determination that a frequency of communications between the first resource and the second resource satisfy the defined communication frequency criterion, wherein respective security groups are associated with respective groups of security rules, and wherein the respective security groups comprise a first security group and a second security group; and associating the first subgroup of resources with the first security group and the second subgroup of resources with the second security group.

14. The system of claim 13, wherein at least a portion of the respective resources of the group of resources are shared amongst tenant identities comprising the tenant identity.

15. The system of claim 13, wherein the operations further comprise performing the analyzing, and wherein the analyzing comprises performing an artificial intelligence analysis on the respective items of data traffic, in accordance with an artificial intelligence algorithm, and wherein the performing the artificial intelligence analysis on the respective items of data traffic comprises applying the respective items of data traffic to a group of artificial intelligence models to facilitate training the group of artificial intelligence models and to facilitate learning or inferring an adapted security rule of the adapted group of security rules.

16. The system of claim 13, wherein the operations further comprise:

based on the result of the analyzing:

determining the respective first communications between the respective resources;

determining respective second communications between the respective resources and network equipment of a communication network; and determining interactions between respective network addresses and respective ports associated with the respective resources.

17. The system of claim 13, wherein the operations further comprise:

with regard to the first subgroup of resources associated with the first security group:

clustering a third portion of the respective network addresses associated with a port of the respective ports to form a group of network addresses associated with the port, or clustering a fourth portion of the respective ports associated with a network address of the respective network addresses to form a group of ports associated with the network address;

wherein the determining of the adapted group of security rules comprises:

based on clustering-related information relating to the clustering of the first portion, the clustering of the second portion, and the clustering of the third portion, or based on input information associated with the tenant identity:

determining respective subgroups of the respective resources comprising the first subgroup of resources and the second subgroup of resources; and determining respective adapted subgroups of security rules associated with respective subgroups of the respective resources, wherein the respective adapted subgroups of security rules comprise a first adapted subgroup of security rules associated with the first security group associated with the first subgroup of resources and a second adapted subgroup of security rules associated with the second security group associated with the second subgroup of resources.

18. The system of claim 13, wherein the group of resources comprises virtual machines.

19. A non-transitory machine-readable medium comprising executable instructions that, when executed by a processor, facilitate performance of operations, the operations comprising:

based on a result of an examining of information relating to respective items of data traffic associated with respective virtual machines of a group of virtual machines associated with a user identity, determining a modified group of security rules to apply to the group of virtual machines, wherein the group of virtual machines are associated with cloud network equipment of a cloud network, and wherein communication of the respective items of data traffic to and from the respective virtual machines had been controlled prior to the determining of the modified group of security rules based on a prior group of security rules associated with the user identity, wherein the determining facilitates controlling communication of subsequent items of data traffic to and from the respective virtual machines based on the modified group of security rules, wherein the result of the examining indicates respective first relationships determined between the respective virtual machines and respective second relationships determined between the respective virtual machines and respective network addresses associated with the cloud network;

clustering a first portion of the respective virtual machines to form a first subgroup of virtual machines and a second portion of the respective virtual machines to form a second subgroup of virtual machines, based on respective first communications determined between the respective virtual machines and a defined communication frequency criterion, wherein a first virtual machine and a second virtual machine of the respective virtual machines are clustered together in the first subgroup of virtual machines based on a determination that a frequency of communications between the first virtual machine and the second virtual machine satisfy the defined communication frequency criterion, wherein respective security groups are associated with respective groups of security rules, and wherein the respective security groups comprise a first security group and a second security group; and associating the first subgroup of virtual machines with the first security group and the second subgroup of virtual machines with the second security group.

20. The non-transitory machine-readable medium of claim 19, wherein the operations further comprise performing the examining, and wherein the examining comprises performing an artificial intelligence analysis process on the respective items of data traffic, in accordance with an artificial intelligence algorithm.

* * * * *